(12) United States Patent
Nabeta et al.

(10) Patent No.: US 8,941,073 B2
(45) Date of Patent: Jan. 27, 2015

(54) RADIOLOGICAL IMAGE DETECTION APPARATUS

(75) Inventors: Toshiyuki Nabeta, Kanagawa (JP); Haruyasu Nakatsugawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 229 days.

(21) Appl. No.: 13/530,663

(22) Filed: Jun. 22, 2012

(65) Prior Publication Data

US 2013/0026372 A1    Jan. 31, 2013

(30) Foreign Application Priority Data

Jul. 29, 2011  (JP) .................. 2011-167021

(51) Int. Cl.
*G01T 1/20* (2006.01)
*H01L 27/146* (2006.01)
*G01T 1/202* (2006.01)
*G03B 42/02* (2006.01)

(52) U.S. Cl.
CPC .............. *G01T 1/2002* (2013.01); *G01T 1/202* (2013.01); *G03B 42/02* (2013.01)
USPC ................. 250/370.11; 250/370.13

(58) Field of Classification Search
USPC ........................ 250/370.11, 370.13
See application file for complete search history.

(56) References Cited

U.S. PATENT DOCUMENTS

| 5,793,047 | A | 8/1998 | Kobayashi et al. |
|---|---|---|---|
| 2002/0109097 | A1 | 8/2002 | Tashiro |
| 2003/0063708 | A1* | 4/2003 | Shoji et al. .................. 378/154 |
| 2004/0108464 | A1* | 6/2004 | Fukui et al. ................ 250/484.4 |
| 2011/0006213 | A1 | 1/2011 | Sato et al. |
| 2011/0049371 | A1* | 3/2011 | Kobayashi ............... 250/361 R |
| 2011/0158390 | A1 | 6/2011 | Ohta et al. |

FOREIGN PATENT DOCUMENTS

| JP | H09-298287 A | 11/1997 |
|---|---|---|
| JP | 2000-077640 A | 3/2000 |
| JP | 2010-186187 A | 8/2010 |
| JP | 2010-217273 A | 9/2010 |
| JP | 2010-276571 A | 12/2010 |
| JP | 2011-017683 A | 1/2011 |
| JP | 2011-033562 A | 2/2011 |
| JP | 2011-133860 A | 7/2011 |

OTHER PUBLICATIONS

Japanese Office Action issued on Oct. 14, 2014 in connection with Japanese Patent Application No. 2011-167021.

* cited by examiner

*Primary Examiner* — David Porta
*Assistant Examiner* — Kenneth J Malkowski
(74) *Attorney, Agent, or Firm* — Jean C. Edwards, Esq.; Edwards Neils PLLC

(57) ABSTRACT

A radiological image detection apparatus includes a scintillator, a pixel array, a first support and a case. The scintillator is formed of phosphor which emits fluorescence when exposed to radiation. The pixel array is provided in close contact with the scintillator and detects the fluorescence emitted from the scintillator. The first support supports at least one of the scintillator and the pixel array. The case includes a plurality of members having a first member provided with a ceiling plate part through which light penetrates. The case houses the scintillator, the pixel array and the support in a lightproof inner space formed by combining the plurality of members. The scintillator and the pixel array are disposed between the first support and the ceiling plate part. The first support absorbs light of a wavelength region corresponding to a part of a wavelength region which is sensed by the pixel array.

14 Claims, 13 Drawing Sheets

RADIOLOGICAL IMAGE DETECTION APPARATUS

CROSS-REFERENCE TO RELATED APPLICATIONS

This application claims the benefit of Japanese Patent Application No. 2011-167021, filed on Jul. 29, 2011, the entire contents of which are hereby incorporated by reference, the same as if set forth at length; the entire of which are incorporated herein by reference.

BACKGROUND OF THE INVENTION

1. Technical Field

The present invention relates to a radiological image detection apparatus.

2. Description of Related Art

In recent years, a radiological image detection apparatus that utilizes a flat panel detector (FPD) for detecting a radiological image to generate digital image data has been put into practical use. The radiological image detection apparatus has been distributed rapidly for the reason that an image can be instantly confirmed as compared with an imaging plate formed of photostimulable phosphor (accumulative phosphor). Various types of radiological image detection apparatus are available and one of them is known as an indirect conversion type radiological image detection apparatus.

The indirect conversion type radiological image detection apparatus includes a scintillator for generating fluorescence when exposed to radiation and a pixel array for detecting the fluorescence of the scintillator. Each of the scintillator and the pixel array is installed at, for example, an individual support and bonded through an adhesive layer. The radiation is converted into light by the scintillator and the fluorescence of the scintillator is converted into an electrical signal by the pixel array, so that digital image data is generated therefrom. An aluminum sheet is typically used as the support for the scintillator, and a glass substrate is typically used as the support for the pixel array. However, a sheet formed of a resin, such as, for example, polyimide, may be used as the support for the scintillator as well as the pixel array (see, for example, JP-A-2011-017683 and JP-A-2011-033562).

The scintillator and the pixel array are received in a case that is formed by combining a plurality of members to be shielded from external light (see, for example, JPA-2010-186187).

SUMMARY

When the shielding of the light is insufficient at a joint portion of the members constituting the case, the external light enters into the case at the joint portion. Especially, a portable type radiological image detection apparatus (e.g., a cassette) may suffer from deterioration in lightproof property at a joint portion by an impact when, for example, the image detection apparatus is dropped.

A polyimide sheet used as a support for a scintillator or a pixel array is typically transparent, and when external light enters into the case, the external light may penetrate into the support to be detected by the pixel array. Further, an aluminum sheet used as the support of the scintillator reflects light, so that the reflected light may be scattered within the case to be incident to a side surface of the scintillator and detected by the pixel array. When external light entering into the case is detected by the pixel array, an image noise occurs.

In the radiological image detection apparatus disclosed in JP-A-2010-186187, the case includes a recess provided on a back member that is a box type where the top side thereof is opened, and a protrusion provided on a front member that covers the opened top side of the back member to be inserted into the recess. The recess and the protrusion constitute a labyrinth structure, so that external light is prevented from entering into the case, thereby complicating the structure of the case due to the labyrinth structure.

The present invention has been made in view of the foregoing matter, and an object of the present invention is to provide a radiological image detection apparatus which is capable of reducing the image noise caused by external light.

A radiological image detection apparatus includes a scintillator, a pixel array, a first support and a case. The scintillator is formed of phosphor which emits fluorescence when exposed to radiation. The pixel array is provided in close contact with the scintillator and is configured to detect the fluorescence emitted from the scintillator. The first support is configured to support at least one of the scintillator and the pixel array. The case includes a plurality of members having a first member provided with a ceiling plate part through which light penetrates. The case is configured to house the scintillator, the pixel array and the support in a lightproof inner space formed by combining the plurality of members. The scintillator and the pixel array are disposed between the first support and the ceiling plate part. The first support absorbs light of a wavelength region corresponding to at least a part of a wavelength region which is sensed by the pixel array.

According to the present invention, a scintillator and a pixel array are disposed between a first support and a lightproof ceiling plate part, and the first support absorbs light of at least a part of wavelength region that is sensed by the pixel array. This may reduce the possibility that the light in the wavelength region absorbed by the first support is detected by the pixel array. Therefore, even when external light enters through a joint portion of a plurality of members that constitute the case, the image noise caused by the entered light may be reduced.

DETAILED DESCRIPTION OF EMBODIMENTS OF THE INVENTION

Figure 1:
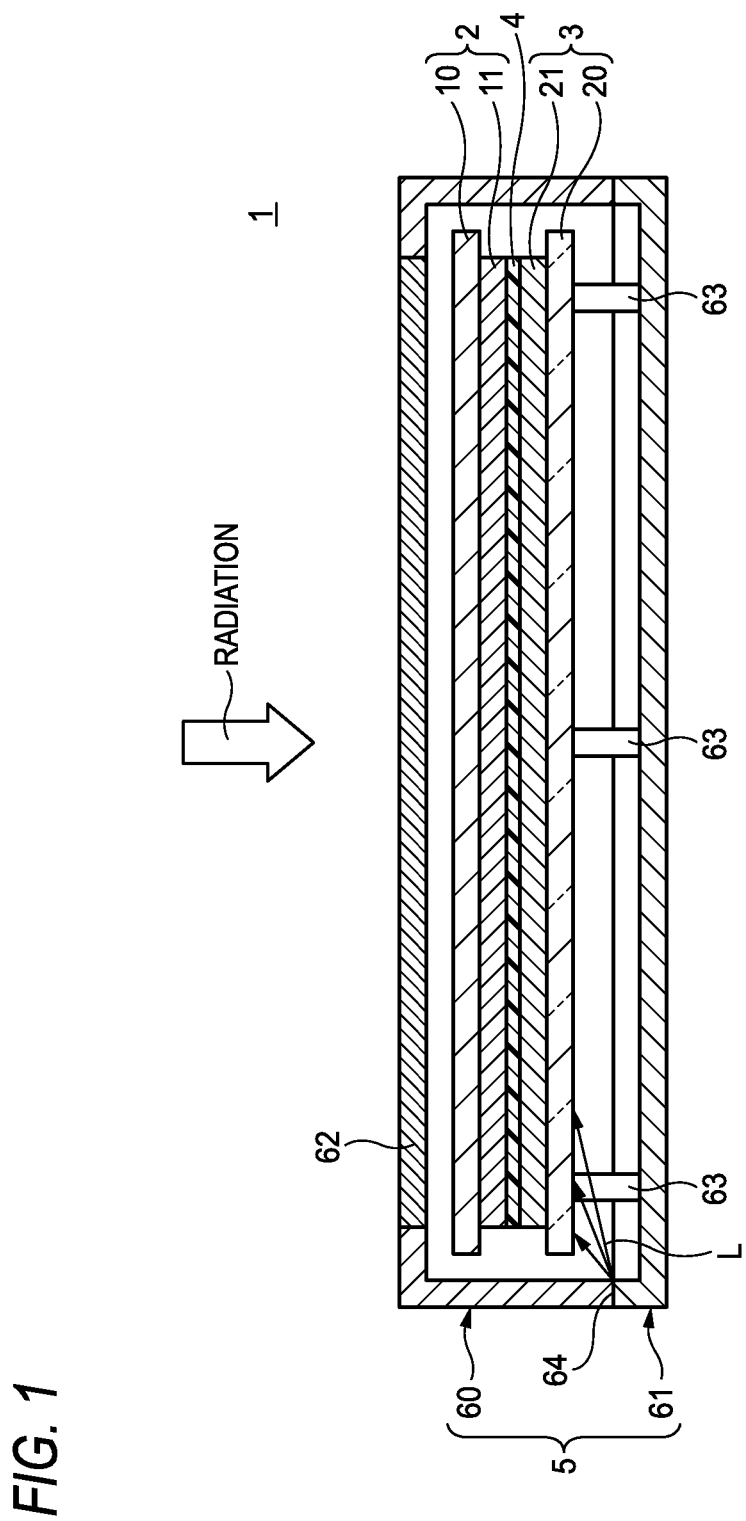
FIG. 1 is a view schematically illustrating the configuration of a radiological image detection apparatus according to an exemplary embodiment of the present invention.

FIG. 1 illustrates a schematic configuration of a radiological image detection apparatus according to an exemplary embodiment of the present invention.

A radiological image detection apparatus 1 illustrated in FIG. 1 includes a radiological image conversion panel 2, a sensor panel 3 and a case 5 for receiving both of the panels 2, 3.

The radiological image conversion panel 2 has a supporting substrate 10 and a scintillator 11 which is made of a phosphor that emits fluorescence when exposed to radiation. The scintillator 11 is formed on the supporting substrate 10.

The sensor panel 3 has an insulating substrate 20 and a pixel array 21 installed on the insulating substrate 20. Each of the pixels of the pixel array 21 can detect the fluorescence generated at the scintillator 11.

The scintillator 11 and the pixel array 21 are bonded together by an adhesive layer 4 interposed therebetween to optically couple the scintillator 11 and the pixel array 21. The adhesive layer 4 is not specifically limited to this as long as the adhesive layer 4 allows the fluorescence of the scintillator 11 to reach the pixel array 21 without attenuation. The adhesive layer 4 is not limited to those that bond the scintillator 11 and the pixel array 21 through wettability-lost adhesion by being solidified, but may include those that bond both of the scintillator 11 and the pixel array 21 through the wettability-kept adhesion. Such adhesive layer 4 may be formed by an adhesive agent such as, for example, a UV curing adhesive agent, a heat-curable adhesive agent, a room temperature-curable adhesive agent or a hot-melt adhesive agent. Alternatively, the adhesive layer 4 may also be formed by a sticking agent such as, for example, a rubber-based sticking agent, a silicone-based sticking agent, or an acrylic-based sticking agent. Alternatively, the adhesive layer 4 may also formed by a double-sided adhesive/sticking sheet in which any of the adhesive agents or the sticking agents is provided on both side thereof. In addition, from the viewpoint of not deteriorating the sharpness of the image, an adhesive agent, which is made of an epoxy resin with a low-viscosity that can form a sufficiently thin adhesive layer with respect to the pixel size, may be used as an adhesive agent. As for the adhesive agent, an acrylic-based adhesive agent which is less degraded by light or oxidation, may be used.

The case 5 is constituted by a first member 60 and a box-type second member 61 of which a top side is opened. The first member 60 includes a ceiling plate part 62 that transmits radiation, and is configured to cover the opened top side of the second member 61 as a lid. The first member 60 and the second member 61 are combined with each other to form a lightproof space therein. A radiological image conversion panel 2 and a sensor panel 3, which are bonded together, are received in the inner space formed by the first member 60 and the second member 61.

A lightproof material that absorbs less radiation may be used for the ceiling plate part 62. For example, a carbon fiber reinforced plastic (CFRP) may be used for the ceiling plate part 62. There is no special limitation for a material for forming either of the first member 60 or the second member 61, except for the ceiling plate part 62. However, a light and highly strong material may be desirable as long as the material has a lightproof property. For example, aluminum or an aluminum alloy, a CFRP, and a glass fiber reinforced plastic (GFRP) may be used for the material of the first member 60 and the second member 61.

The radiological image detection apparatus 1 is so called a penetration side sampling (PSS) radiological image detection apparatus, in which the radiological image conversion panel 2 and the sensor panel 3 are arranged in this order from the side of the ceiling plate part 62 of the case 5 to which radiation is incident. More specifically, the supporting substrate 10, the scintillator 11, the pixel array 21, and the insulating substrate 20 are arranged in this order from the side of the ceiling plate part 62 of the case 5. Here, radiation penetrates the ceiling plate part 62 and the supporting substrate 10 to be incident to the scintillator 11. When the radiation is incident to the scintillator 11, fluorescence is generated, which is detected by the pixel array 21.

The radiological image conversion panel 2 and the sensor panel 3 arranged as described above are supported by a plurality of ribs 63 provided vertically on the second member 61, and are fixed in the inner space of the case 5. Edges of the joint portion 64 of the first member 60 and the second member 61 in the inner space exist at all around the inner surfaces, and the entire edges are located closer to the bottom side of the case 5 which opposes the ceiling plate part 62 than the insulating substrate 20 of the sensor panel 3.

Figure 2:
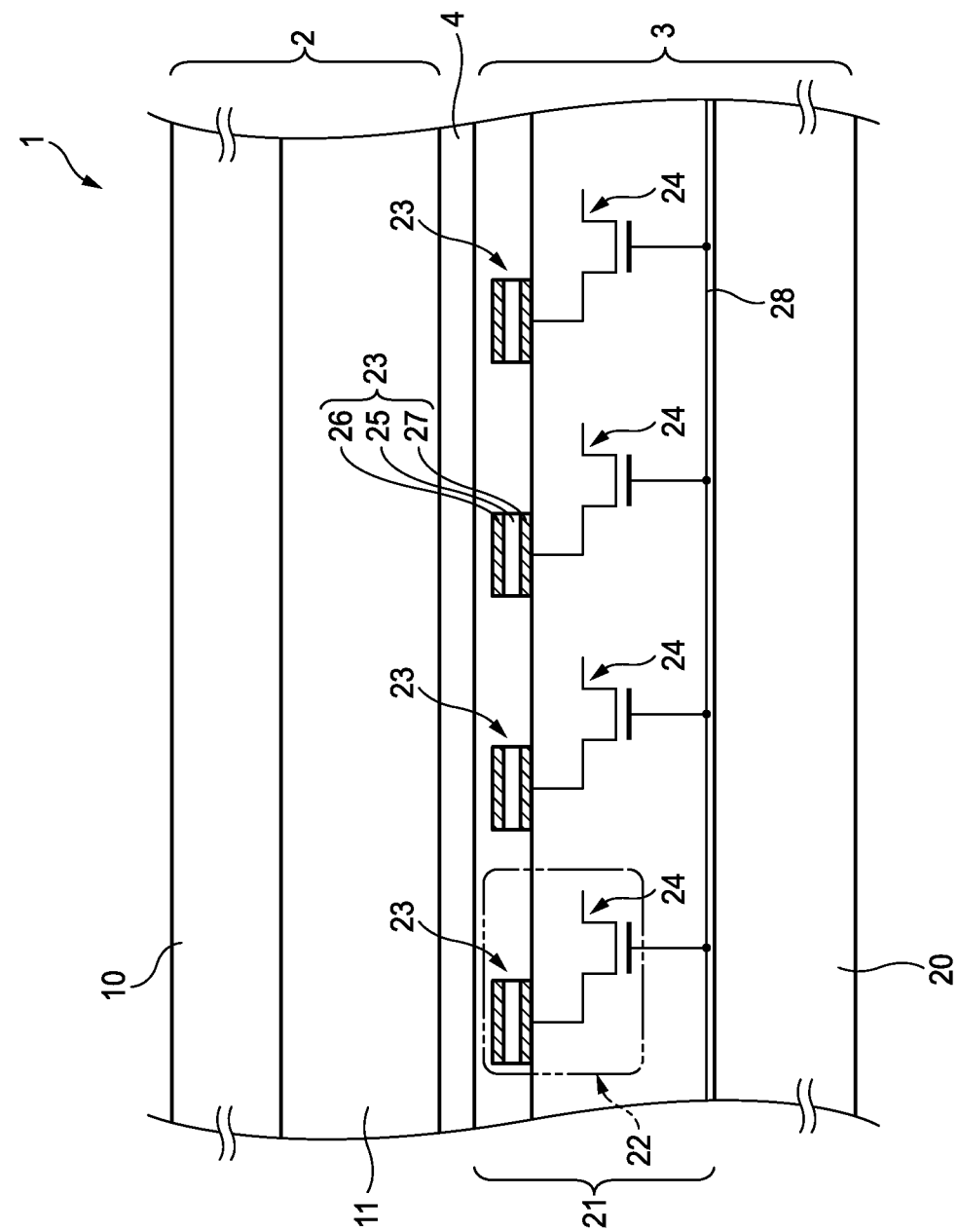
FIG. 2 is a view schematically illustrating the configuration of a sensor panel of the radiological image detection apparatus in FIG. 1.
Figure 3:
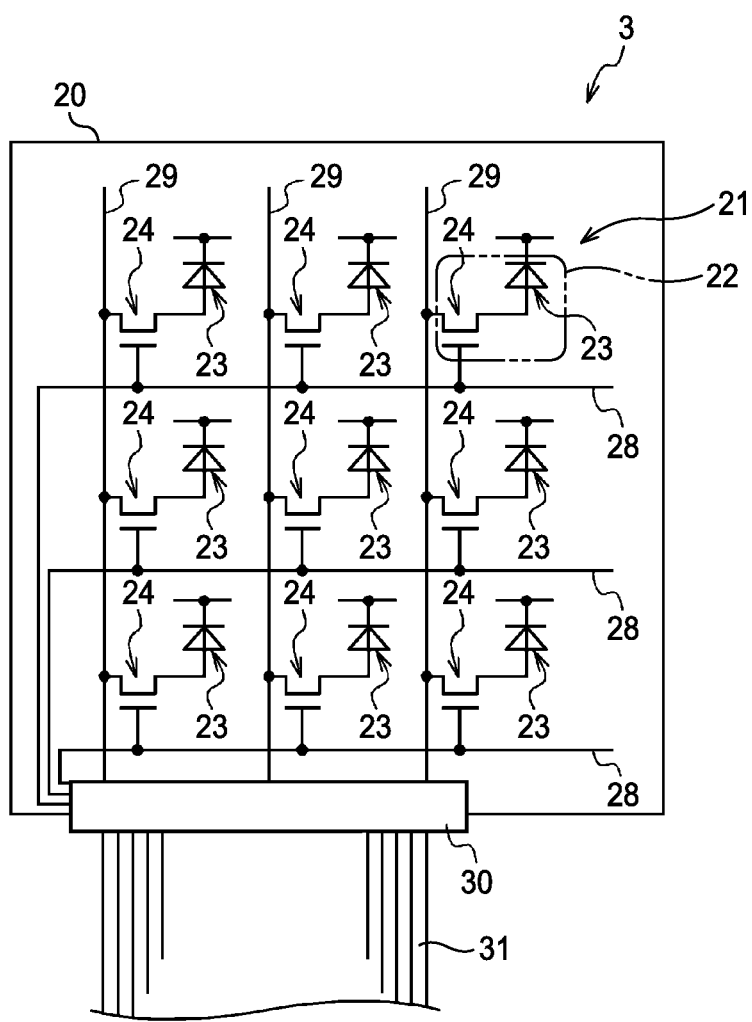
FIG. 3 is a view schematically illustrating the configuration of the sensor panel of the radiological image detection apparatus in FIG. 1.

FIGS. 2 and 3 illustrate the configuration of the sensor panel 3.

The pixel array 21 is formed by a plurality of pixels 22 arranged in a two-dimensional form on the insulating substrate 20, and each of the pixels 22 is constituted by a photoelectric conversion element 23 and a switching device 24.

The photoelectric conversion element 23 includes a photoconductive layer 25, which receives the fluorescence of the scintillator 11 and generates electric charges, and a pair of electrodes 26, 27 installed on the front and back surfaces of the photoconductive layer 25, respectively. The electrode 26 installed on the surface of the scintillator 11 side of the photoconductive layer 25 applies a bias voltage to the photoconductive layer 25, and the electrode 27 installed on the opposite surface collects the electric charges generated by the photoconductive layer 25. The electric charge collection electrode 27 is connected to the switching device 24, and the electric charges collected by the electric charge collection electrode 27 are read out through the switching device 24.

A plurality of gate lines 28 and a plurality of signal lines (data lines) 29 are provided on the insulating substrate 20 in a two-dimensional form. The gate lines 28 extend in one of the directions (e.g., a row direction) of the pixels 22 arranged in the two-dimensional form, so as to turn ON/OFF the switching device 24 of each pixel 22, and the signal lines 29 extend in a perpendicular direction to the gate lines 28 (e.g., a column direction) so as to read out the electric charges through the switching device 24 which has been turned ON. In addition, each of the gate lines 28 and the signal lines 29 is connected to a connection circuit 31 at a connection terminal portion 30 provided at an edge portion of the insulating substrate 20, and connected to a circuit board (not shown) having a gate driver and a signal processing unit, through the connection circuit 31.

The switching devices 24 are turned ON sequentially row by row in accordance with signals supplied from the gate driver through the gate lines 28. Further, the electric charges read out by the switching devices 24 which have been turned ON are transmitted to the signal lines 29 as the electric charge signals and input to the signal processing unit. Thus, the electric charges are read out sequentially row by row, and converted into electric signals in the signal processing unit to generate digital image data.

Although a glass substrate is typically used as the insulating substrate 20, a flexible resin substrate may be used as well. As for the resin substrate, a sheet made of, for example, polyethylene terephthalate (PET), polyethylene naphthalate (PEN), polyether sulfone (PES), polyether imide, polyetherether-ketone, polyphenylene sulphide, poly carbonate (PC), cellulose triacetate (TAC), cellulose acetate propionate (CAP), polyimide, polyarylate, and bi-axially stretched polystyrene (OPS), may be used. Further, organic or inorganic fillers may be contained in such a plastic sheet. A flexible resin substrate may also be used by using, for example, an aramid or a bio nano-fiber which has a characteristic that cannot be obtained by an existing glass or plastic, such as, for example, low thermal expansion and high strength, while being flexible.

The photoelectric conversion element 23 may be configured by an amorphous silicon photodiode utilizing, for example, a PN junction or a PIN junction of amorphous silicon in a photoconductive layer 25. In addition to the amorphous silicon, an organic photoelectric conversion film made of an organic compound, such as quinacridone, may be used as the photoconductive layer 25. The organic photoelectric conversion film will be described below.

The switching device 24 may be configured by, for example, a thin film transistor (TFT) utilizing amorphous silicon as an active layer. In addition to the amorphous silicon, amorphous oxide semiconductor materials and organic semiconductor materials may be used as the active layer of the TFT. The amorphous oxide semiconductor materials and the organic semiconductor materials will be described below.

An array of photoelectric conversion elements 23 and an array of switching devices 24 may be formed in a single layer, or the array of switching devices 24 and the array of photoelectric conversion elements 23 may be formed in different layers from the scintillator 11 side in this order. As in the illustrated example, however, the array of photoelectric conversion elements 23 and the array of switching devices 24 may be formed in different layers from the scintillator 11 side in this order. When the array of photoelectric conversion elements 23 and the array of switching devices 24 are formed in different layers, the size of the photoelectric conversion elements 23 can be increased. In addition, when the array of photoelectric conversion elements 23 and the array of switching devices 24 are formed in this order from the scintillator 11 side, the array of photoelectric conversion elements 23 may be disposed close to the scintillator 11, thereby improving the sensitivity.

Figure 4:
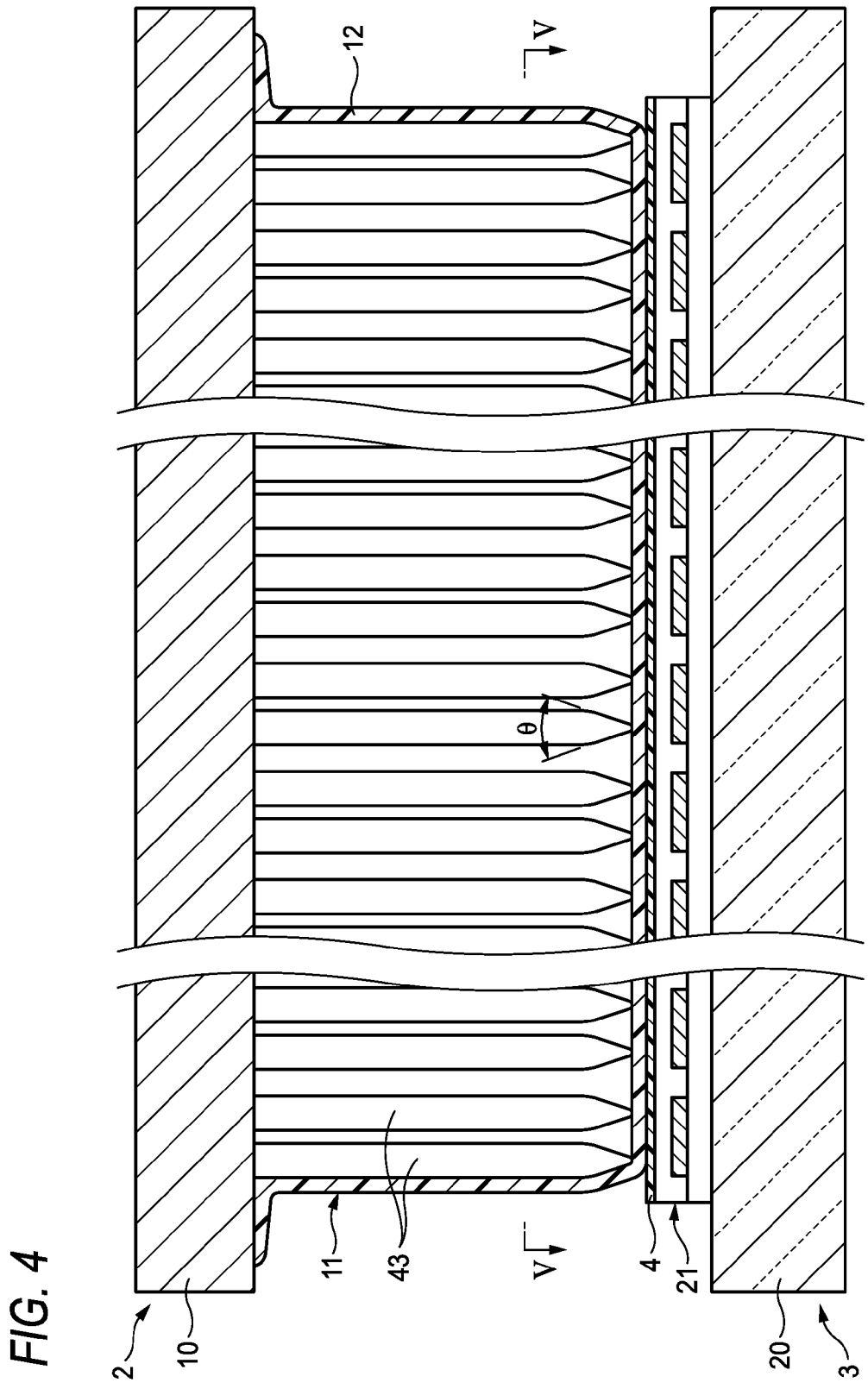
FIG. 4 is a view schematically illustrating the configuration of a scintillator of the radiological image detection apparatus in FIG. 1.

FIG. 4 illustrates the configuration of a radiological image conversion panel 2.

The scintillator 11 is formed by a group of columnar crystals 43 which are obtained by growing the crystals of the phosphors in a columnar shape. A plurality of adjacent columnar crystals may be coupled to form one columnar crystal. There are voids between adjacent columnar crystals 43, and the columnar crystals 43 exist independently of one another.

An alkali halide phosphor such as, for example, CsI:Tl (thallium doped cesium iodide), NaI:Tl (thallium doped sodium iodide), and CsI:Na (sodium doped cesium iodide) may be used as a fluorescent material for the scintillator 11 formed by a group of columnar crystals. In particular, CsI:Tl may be desirable in that the emission spectrum thereof is suitable for the maximum value (around 550 nm) of spectral sensitivity of an amorphous silicon photodiode.

The above-described alkali halide phosphor has a deliquescent property, and the scintillator 11 is coated with a protective film 12. As for the protective film 12, poly-paraxylene is typically used and may be formed as a film on the surface of the scintillator 11 by a vapor deposition method. A film made of a polymer compound with a low permeability, such as, for example, polyethylene terephthalate (PET), polyester, polymethacrylate, nitrocellulose, cellulose acetate, polypropylene and polyethylene terephthalate, may be used as the protective film 12.

The scintillator 11 is bonded to the pixel array 21 on a side (a fluorescence projection surface) constituted by a group of tip ends of columnar crystals 43. The fluorescence generated in the scintillator 11 by the radiation exposure is emitted toward the pixel array 21 from the fluorescence emitting surface constituted by the group of the tip ends of columnar crystals 43.

The fluorescence generated in each columnar crystal 43 is restrained from being diffused by a repeated total reflection within the columnar crystal 43 due to the difference in refractive index between the columnar crystal 43 and voids surrounding the columnar crystal 43. Thus, the sharpness of an image can be improved.

Also, the tip ends of the columnar crystals 43 are sharply tapered. Since the tip ends of the columnar crystals 43 are formed in such a convex shape, the light extraction efficiency thereof is increased and the sensitivity thereof is improved as compared to those formed in a flat or concave shape. Preferably, the angle θ of each of the tip ends may be in the range of 40 degrees to 80 degrees.

The length of the columnar crystals 43 (the thickness of the scintillator 11) may be set depending on the energy of radiation but may be set preferably in a range not smaller than 200 μm and not larger than 700 μm in order to secure sufficient radiation absorption in the scintillator 11 and sufficient image sharpness. When the thickness of the scintillator 11 is too small, radiation may not be absorbed sufficiently, so that the sensitivity may be deteriorated. When the thickness is too large, optical diffusion occurs so that the image sharpness may be deteriorated in spite of the light guide effect of the columnar crystals 43.

Figure 5:
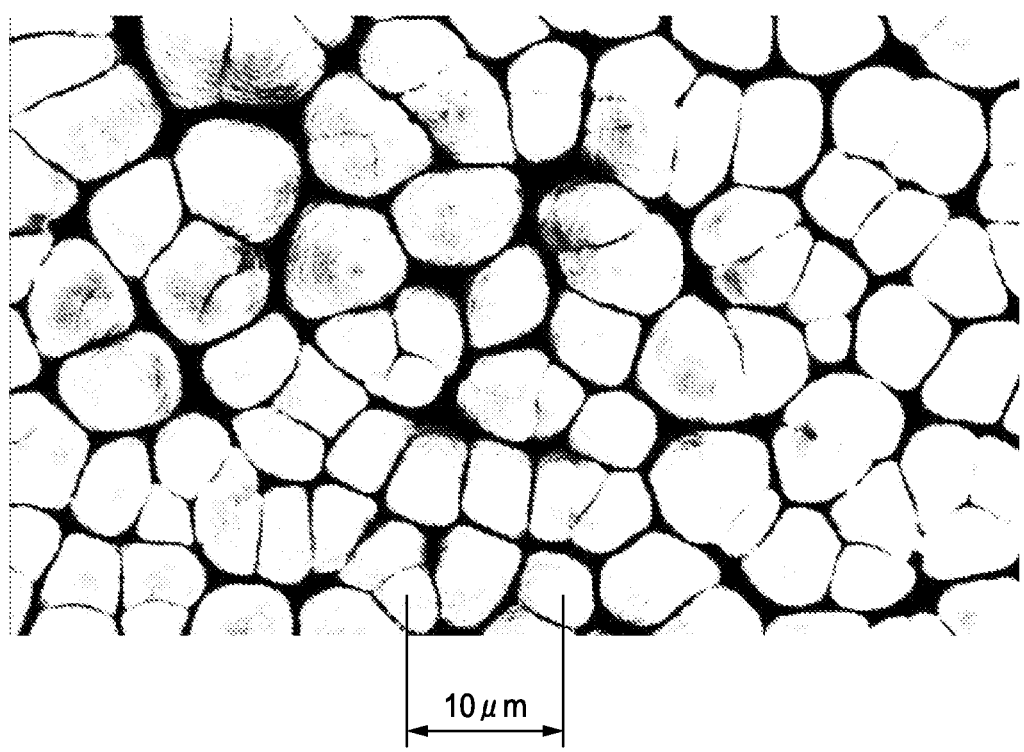
FIG. 5 is a cross-sectional view illustrating the scintillator taken along line V-V in FIG. 4.

FIG. 5 shows an electron microscope photograph showing a section of the scintillator 13 taken on line IV-IV in FIG. 4.

As is apparent from FIG. 5, it is understood that each columnar crystal 43 shows a substantially uniform sectional diameter with respect to the growth direction of the crystal, and exist independently due to an air gap around each columnar crystal 43. It is preferable that the crystal diameter (columnar diameter) of each columnar crystal 43 is not smaller than 2 μm and not larger than 8 μm, from the viewpoints of light guide effect, mechanical strength and pixel defect prevention. When the columnar diameter is too small, each columnar crystal 43 is short of mechanical strength so that there is a fear that the columnar crystal 43 may be damaged by a shock or the like. When the crystal diameter is too large, the number of columnar crystals 43 for each image element is reduced so that there is a fear that it is highly likely that the image element may be defective when one of the crystals corresponding thereto is cracked.

Here, the crystal diameter designates the maximum diameter of a columnar crystal 43 observed from above in the growth direction of the crystal. As for a specific measurement method, the columnar diameter of each columnar crystal 43 is measured by observation in an SEM (Scanning Electron Microscope) from the growth-direction top of the columnar crystal 43. The observation is performed in the magnification (about 2,000 times) with which 100 to 200 columnar crystals 43 can be observed in each shot. The maximum values of columnar diameters of all the crystals taken in the shot are measured and averaged. An average value obtained thus is used. The columnar diameters (μm) are measured to two places of decimals, and the average value is rounded in the two places of decimals according to JIS Z 8401.

The scintillator 11 is formed on the supporting substrate 10 by, for example, a vapor deposition method. In a case where CsI:Tl is used as the phosphor, CsI:Tl is heated and evaporated in an atmosphere with a vacuum degree of 0.01 Pa to 10 Pa, for example, by applying electric power to a resistance-heated crucible, so that crystals of CsI:Tl are deposited on the supporting substrate 10 whose temperature is set in a range from a room temperature (20° C.) to 300° C.

Then, the temperature of the supporting substrate 10 at the end of growth of the columnar crystals 43 may be controlled to control the shape of the tip ends (tip end angle θ) of the columnar crystals 43. In general, the angle may be controlled to 170 degrees at 110° C., to 60 degrees at 140° C., to 70 degrees at 200° C., and to 120 degrees at 260° C.

The supporting substrate 10 is not specifically limited as long as the scintillator 11 can be formed thereon. For example, a glass substrate, a sapphire substrate, and a substrate formed of a metal, such as iron, tin, chromium or aluminum, may be used as the supporting substrate 10. Also, a flexible resin substrate, such as the insulating substrate 20, may be used.

The radiological image detection apparatus 1 of the present exemplary embodiment is a PSS radiological image detection apparatus and radiation is incident to the scintillator 11 through the supporting substrate 10. Therefore, a substrate that absorbs less radiation may be used as the supporting substrate 10. The scintillator 11 is formed by a group of columnar crystals 43, and thus a distribution may occur in the thickness of the scintillator 11 and unevenness may occur on the fluorescence emitting surface to be bonded to the pixel array 21 of the scintillator 11. In order to mitigate the influence of the unevenness of the fluorescence emitting surface and the distribution of the thickness of the scintillator 11 in the bonding of the scintillator 11 and the pixel array 21, a flexible supporting substrate 10 may be used. From the above viewpoints, the above-described flexible resin substrate may be preferably used as the supporting substrate.

In the radiological image detection apparatus 1 configured as described above, the scintillator 11 and the pixel array 21 are disposed between the insulating substrate 20 and the ceiling plate part 62 of the case 5, and the insulating substrate 20 has a characteristic that absorbs light of at least a part of a wavelength region that is sensed by the pixel array 21.

Referring to FIG. 1, when external light L enters into the inner space of the case 5 from the joint portion 64 of the case 5, a component of light included in an absorption wavelength region of the insulating substrate 20 is absorbed by the insulating substrate 20. Accordingly, the external light L, which enters into the inner space, is prevented from being received by the pixel array 21, thereby reducing the image noise.

Specifically, the entire edge of the joint portion 64 of the case 5 is located closer to the bottom side of the case 5 than the insulating substrate 20. Therefore, even if the light is diffused by diffraction at the edge of the joint portion 64, almost all of the light is blocked by the insulating substrate 20 and is suppressed from being reached to the pixel array 21 which is located closer to the ceiling plate part 62 side than the insulating substrate 20. Accordingly, the external light L, which enters into the inner space, is further suppressed from being received by the pixel array 21, thereby reducing the image noise.

Figure 6:
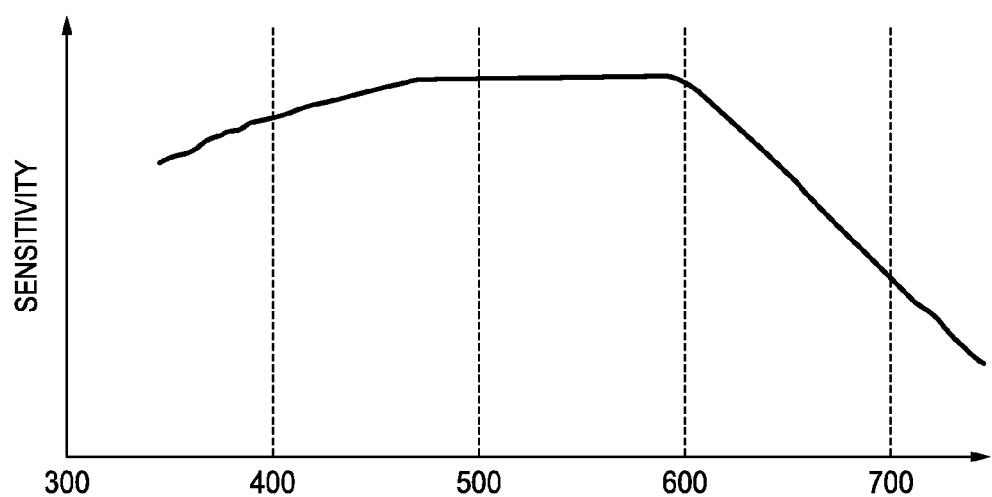
FIG. 6 is a view illustrating an example of a spectral sensitivity curve of a pixel array.

FIG. 6 is a view illustrating an example of a spectral sensitivity curve of a pixel 22. When the photoelectric conversion element 23 constituting the pixel 22 is configured by, for example, the above-described amorphous silicon photodiode, the spectral sensitivity of the pixel 22 is distributed from a near ultra-violet region to a visible region, and the sensitivity maximum wavelength is positioned near 550 nm. In this case, the insulating substrate 20 absorbs the light from at least a part of the region from the near ultra-violet region to the visible region, and includes the maximum sensitivity wavelength of the pixel 22, 550 nm, in the absorption wavelength region thereof. As the absorption wavelength region of the insulating substrate 20 includes the maximum sensitivity wavelength of the pixel 22, image noise can be effectively reduced.

While a glass plate or a resin substrate may be used as the insulating substrate 20 as described above, the insulating substrate 20 may be coated with a paint or mixed with a coloring agent such as a pigment or a dye to add an absorption characteristic.

In order to absorb light of a specific wavelength region, the insulating substrate 20 may be colored with a complementary color corresponding to the wavelength region. For example, since the maximum sensitivity wavelength, 550 nm, of the pixel 22 corresponds to green, the insulating substrate 20 may be colored with red to absorb the light with wavelength region of 550 nm and the vicinity thereof. In addition, when the insulating substrate 20 is colored with black using, for example, a carbon black, the absorption characteristic of the insulating substrate 20 can reduce the image noise more securely throughout the entire visible region.

Figure 7:
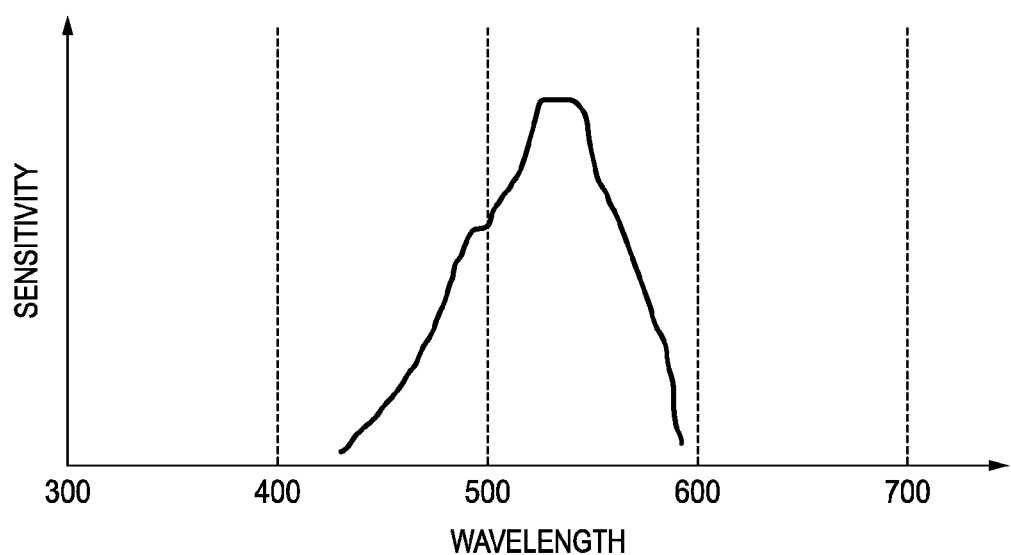
FIG. 7 is a view illustrating another example of the spectral sensitivity curve of the pixel array.

FIG. 7 is a view illustrating another example of the spectral sensitivity curve of the pixel 22.

When an organic photoelectric conversion film made of quinacridone is used in the photoconductive layer 25 of the photoelectric conversion element 23, the spectral sensitivity of the pixel 22 is distributed from 450 nm to 600 nm, and the maximum sensitivity wavelength thereof is positioned near 560 nm which is green. In order to absorb the light of the wavelength region of 560 nm and the vicinity thereof, the insulating substrate 20 may be colored with red or black.

According to the radiological image detection apparatus 1 described above in which the scintillator 11 and the pixel array 21 are disposed between the insulating substrate 20 and the lightproof ceiling plate part 62, the insulating substrate 20 may absorb light of at least a part of wavelength region that is sensed by the pixel array 21, and reduce the possibility that the light of the absorption wavelength region of the insulation substrate 20 is detected by the pixel array 21. Accordingly, even if the external light L enters into the case from the joint portion 64 of the case 5 between the first member 60 and the second member 61, the image noise caused by the light may be reduced.

Figure 8:
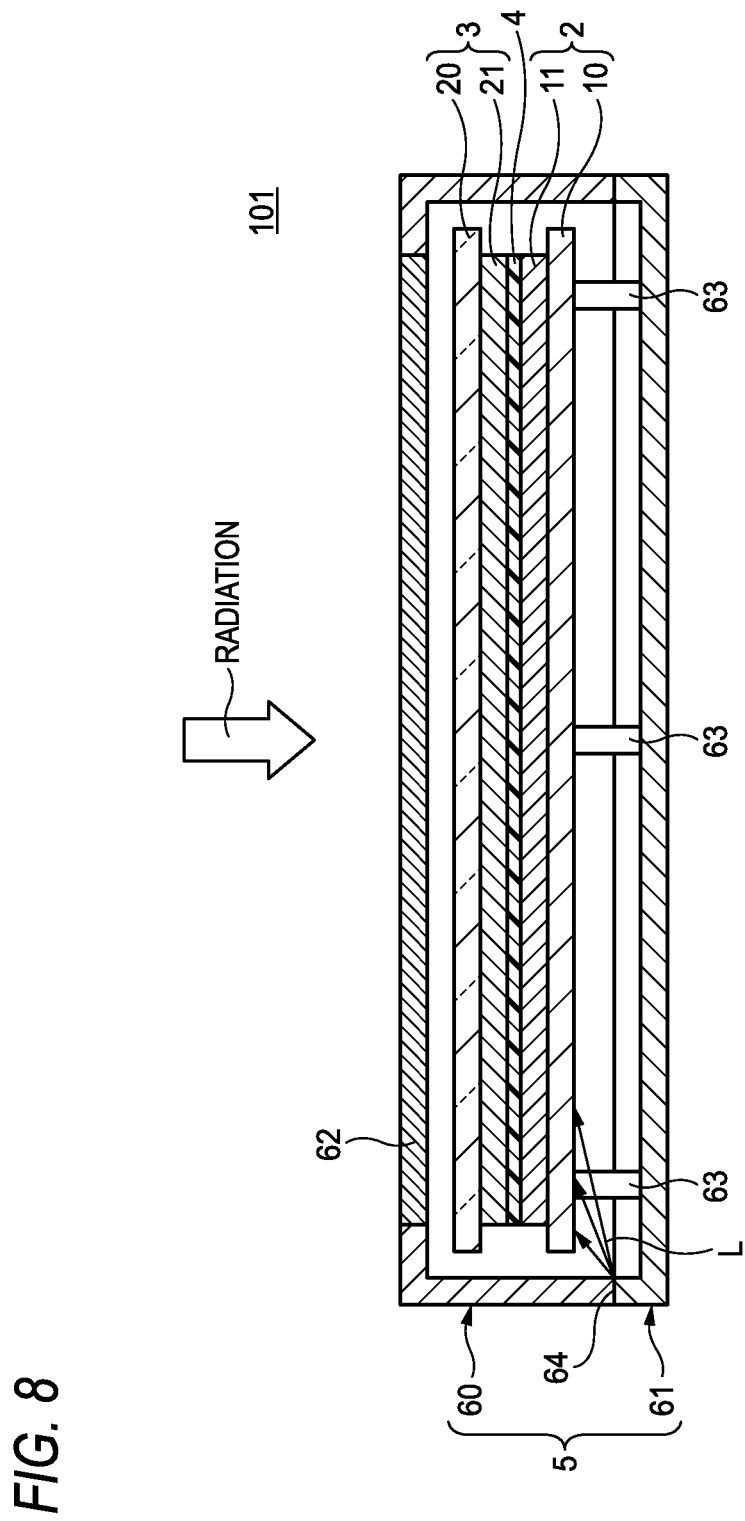
FIG. 8 is a view schematically illustrating the configuration of a radiological image detection apparatus according to another exemplary embodiment of the present invention.

FIG. 8 illustrates a configuration of a radiological image detection apparatus according to another exemplary embodiment of the present invention. In addition, with respect to the elements common to those of the above-described radiological image detection apparatus 1, the description thereof will be omitted or simplified by adding the common numeral references.

A radiological image detection apparatus 101 illustrated in FIG. 8 includes a radiological image conversion panel 2, a sensor panel 3 and a case 5 for receiving both of the panels 2, 3.

The radiological image detection apparatus 101 is so called a irradiation side sampling (ISS) radiological image detection apparatus, in which the sensor panel 3 and the radiological image conversion panel 2 are arranged in this order from the ceiling plate part 62 side of the case 5 to which radiation is incident. More specifically, an insulating substrate 20, a pixel array 21, a scintillator 11, and a supporting substrate 10 are arranged in this order from the ceiling plate part 62 side of the case 5. The radiation penetrates the ceiling plate part 62, and then penetrates the insulating substrate 20 and the pixel array 21 to be incident to the scintillator 11.

A joint portion 64 of the case 5 between a first member 60 and a second member 61 is located closer to the bottom side of the case 5 opposing to the ceiling plate part 62 than the supporting substrate 10 of the radiological image conversion panel 2.

In the radiological image detection apparatus 101 configured as described above, the scintillator 11 and the pixel array 21 are disposed between the supporting substrate 10 of the radiological image conversion panel 2 and the ceiling plate part 62 of the case 5, and the supporting substrate 10 has a characteristic that absorbs light of at least a part of a wavelength region that is sensed by the pixel array 21.

The supporting substrate 10 may be coated with a paint or colored by mixing a coloring agent such as a pigment or a dye to add the light absorption characteristic.

When external light L enters into the inner space of the case 5 from the joint portion 64 of the case 5, a light component included in the absorption wavelength region of the supporting substrate 10 is absorbed by the supporting substrate 10. Accordingly, the external light L, which enters into the inner space, is suppressed from being received by the pixel array 21, which can reduce the image noise.

In particular, the entire edge of the joint portion 64 of the case 5 is located closer to the bottom side of the case 5 than the supporting substrate 10. And even if the light is diffused by diffraction at the edge of the joint portion 64, almost all of the light is blocked by the supporting substrate 10 and is suppressed from being reached at the pixel array 21 which is located closer to the ceiling plate part 62 side than the supporting substrate 10. Accordingly, the external light L, which enters into the inner space, is further suppressed from being received by the pixel array 21, and, as a result, the image noise can be reduced.

The radiological image detection apparatus 101 is an ISS radiological image detection apparatus. As compared to the PSS radiological image detection apparatus 1 described above, the pixel array 21 is disposed to be spaced from the edge of the joint portion 64. Accordingly, the pixel array 21 is hardly affected by the external light L entering from the joint portion 64, which can reduce the image noise.

In the ISS radiological image detection apparatus 101, the sensitivity is improved since the radiation incident side of the scintillator 11, which generates a lot of fluorescence, is provided close to the pixel array 21.

The radiological image conversion panel 2 and the sensor panel 3 are bonded together and supported by a plurality of ribs 63 provided vertically on the second member 61 to be fixed in the inner space of the case 5. However, the insulating substrate 20 of the sensor panel 3 may be fixed to the ceiling plate part 62 by bonding the insulating substrate 20 to the ceiling plate part 62. With this configuration, there is no gap between the ceiling plate part 62 and the insulation substrate 20, and the light, which enters around the insulating substrate 20 side and reaches the pixel array 21, may be blocked by the ceiling plate part 62.

Figure 9:
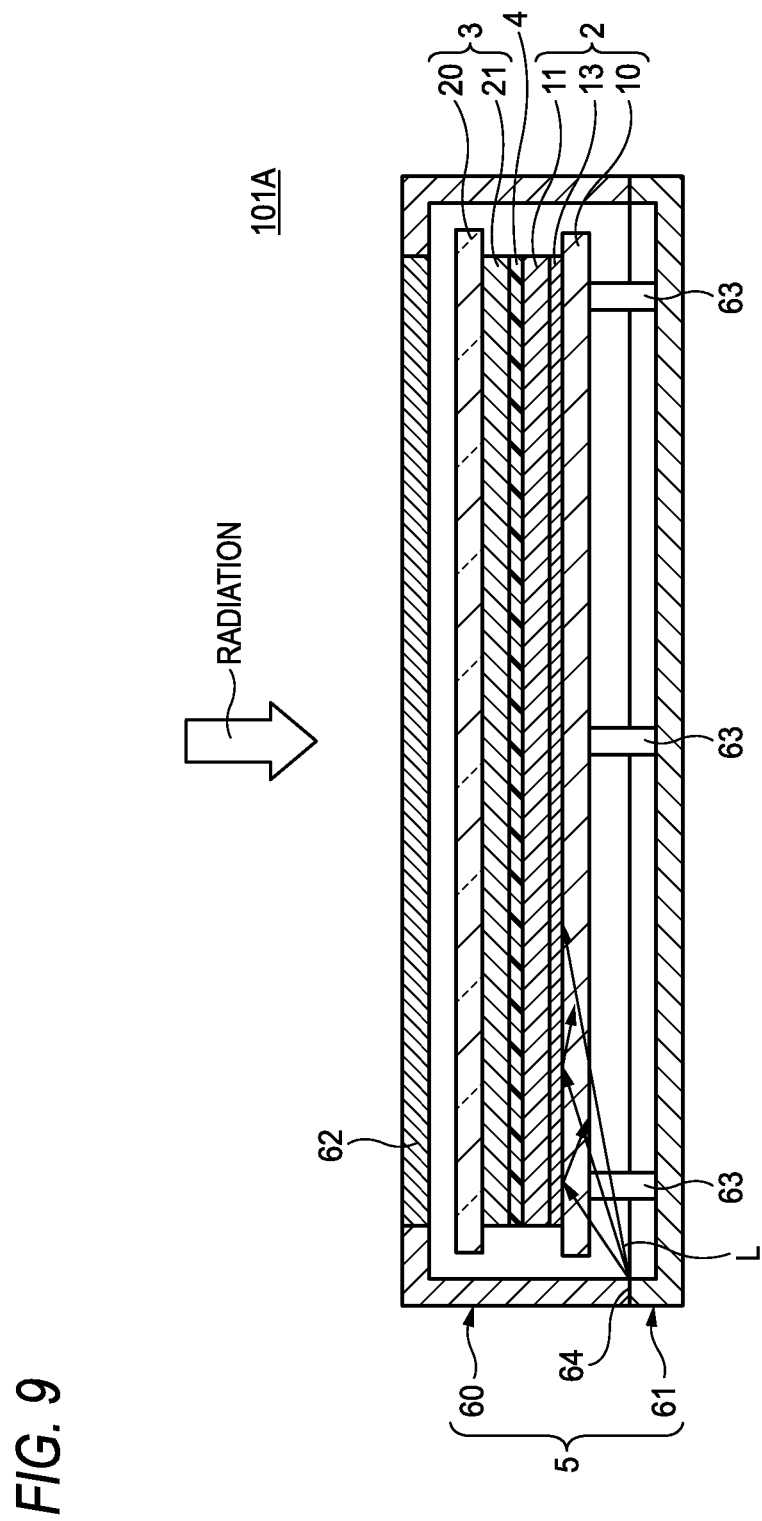
FIG. 9 is a view schematically illustrating the configuration of a modified example of the radiological image detection apparatus in FIG. 8.

FIG. 9 illustrates the configuration of a modified embodiment of the above-mentioned radiological image detection apparatus 101.

In the radiological image detection apparatus 101A illustrated in FIG. 9, a supporting substrate 10 is made of a material that is formed by coloring a transparent or semi-transparent resin material in accordance with a wavelength region to be absorbed. Further, a reflecting layer 13 is installed between the supporting substrate 10 and the scintillator 11.

In the present example, the reflecting layer 13 is provided by forming a light reflective metallic thin film, such as an aluminum, on the surface of the supporting substrate 10 on which the scintillator 11 is formed. The metallic thin film may be formed on the surface of the supporting substrate 10 by, for example, a vapor deposition.

The light, which enters from the joint portion 64 and is incident to the supporting substrate 10, is absorbed by the supporting substrate 10 and gradually attenuated, but the light may sometimes reach the reflecting layer 13 without being attenuated. The light, which reaches the reflecting layer 13, is reflected by the reflecting layer 13, passes through the supporting substrate 10 again without being incident to the scintillator 11 side, and absorbed by the supporting substrate 10 to be attenuated sufficiently. With such a configuration, for obtaining a predetermined amount of attenuation, it is possible to reduce the thickness of the supporting substrate 10 as compared to a case where the reflecting layer is not formed.

In addition, among the fluorescence generated in each columnar crystal 43 by a radiation exposure, a fluorescence traveling toward the opposite side to the pixel array 21, that is, toward the supporting substrate 10 side, is reflected toward the pixel array 21 by the reflecting layer 13. Thus, the utilization efficiency of the fluorescence is enhanced, and the sensitivity is improved.

Figure 10:
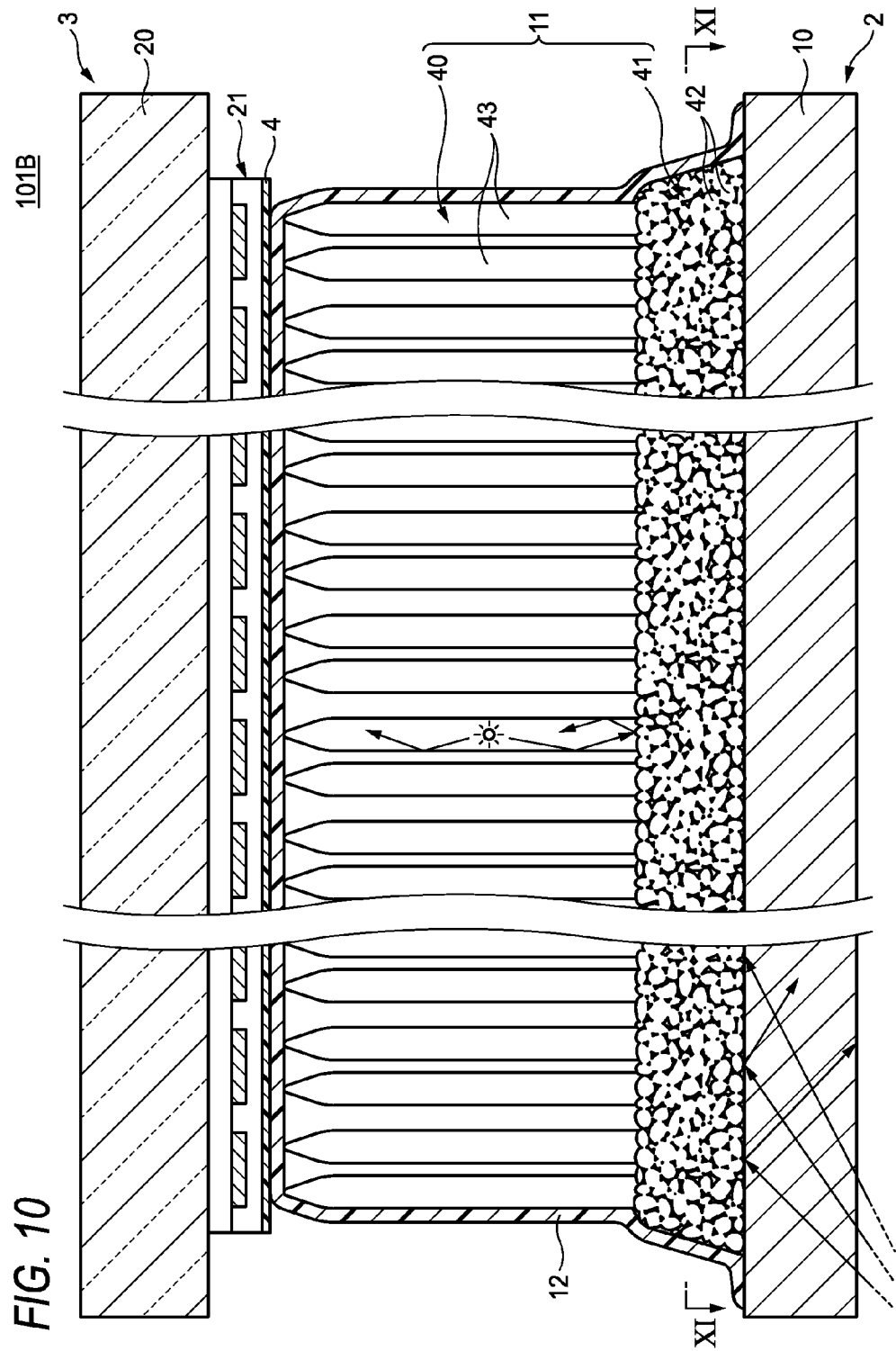
FIG. 10 is a view schematically illustrating the configuration of another modified example of the radiological image detection apparatus in FIG. 8.

FIG. 10 illustrates the configuration of another modified embodiment of the above-mentioned radiological image detection apparatus 101.

In the radiological image detection apparatus 101B illustrated in FIG. 10, a supporting substrate 10 is made of a material that is formed by coloring a transparent or semi-transparent resin material in accordance with a wavelength region to be absorbed.

The scintillator 11 includes a columnar portion 40 formed by a group of columnar crystals and a non-columnar portion 41, and the non-columnar portion 41 and the columnar portion 40 are formed in this order on the supporting substrate 10.

The non-columnar portion 41 is formed of a group of relatively small granular crystals 42 of a fluorescent material. Also, there may be a case where the non-columnar portion 41 includes an amorphous material of the aforementioned fluorescent material. In the non-columnar portion 41, the granular crystals are irregularly coupled or overlapped each other.

The non-columnar portion 41 includes fine voids scattered therein and serves as a reflecting layer due to the fine voids in place of the reflecting layer 13 in the above-described radiological image detection apparatus 101A. Accordingly, in a case where light entering from the joint portion 64 and incident to the supporting substrate 10 reaches the non-columnar portion 41 without being incident, the light is reflected by the non-columnar portion 41, and passes through the supporting substrate 10 again without being incident to the columnar portion 40. As a result, the light is absorbed by the supporting substrate 10 and sufficiently attenuated.

In addition, the non-columnar portion 41 is dense as compared to the columnar portion 40, and its void ratio is small. Since the non-columnar portion 41 is interposed between the supporting substrate 10 and the columnar portion 40, the adhesion of the supporting substrate 10 and the scintillator 11 is improved, and thus the scintillator 11 is prevented from being peeled from the supporting substrate 10.

Figure 11:
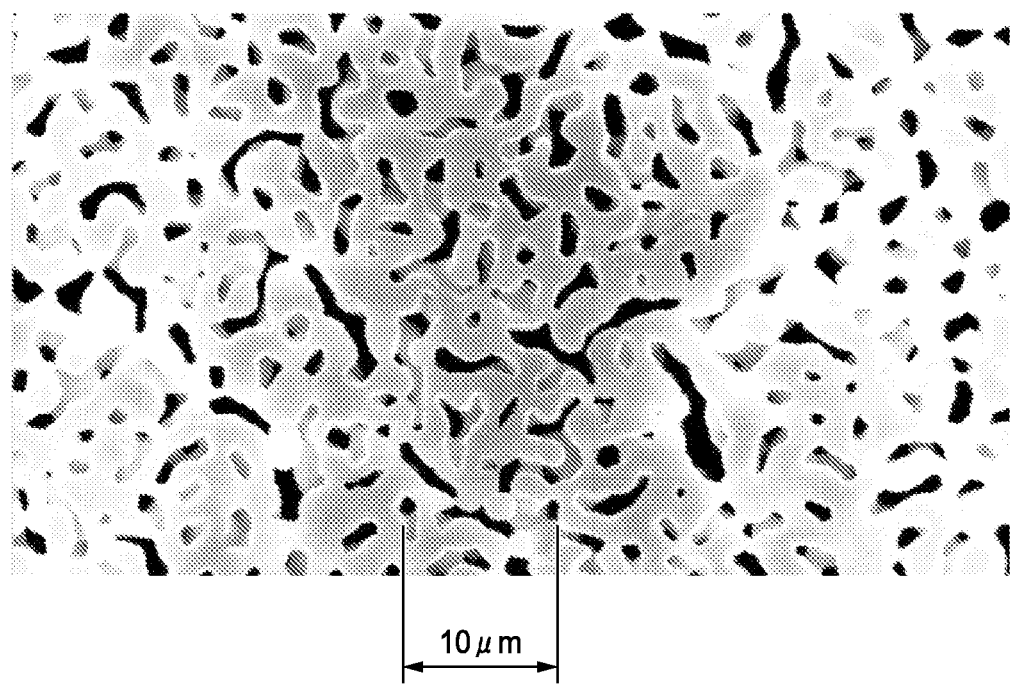
FIG. 11 is a sectional view illustrating the scintillator taken along line XI-XI in FIG. 10.

FIG. 11 shows an electron microscope photograph showing a section of the scintillator 11 taken on line XI-XI in FIG. 10.

As is apparent from FIG. 11, in the non-columnar portion 41, the granular crystals 42 are irregularly coupled or laid on one another so that no distinct air gap among the crystals can be recognized in comparison with the columnar portion 40. From the viewpoints of adhesion and optical reflection, it is preferable that the diameter of each granular crystals 42 forming the non-columnar portion 41 is not smaller than 0.5 μm and not larger than 7.0 μm. When the crystal diameter is too small, the void ratio is close to zero so that there is a fear that the function of optical reflection may deteriorate. When the crystal diameter is too large, the flatness deteriorates so that there is a fear that the adhesion to the supporting substrate 10 may deteriorate. In addition, from the viewpoint of optical reflection, it is preferable that the shape of each granular crystal 42 forming the non-columnar portion 41 is substantially spherical.

When crystals are coupled with each other in the non-columnar portion 41, the crystal diameter of each crystal is measured as follows. That is, a line obtained by connecting recesses (concaves) generated between adjacent crystals is regarded as the boundary between the crystals. The crystals coupled with each other are separated to have minimum polygons, and the columnar diameters are measured thus. An average value of the crystal diameters is obtained in the same manner as the crystal diameter in the columnar portion 40. The average value obtained thus is used as the crystal diameter in the non-columnar portion 41.

It is preferable that the thickness of the non-columnar portion 41 is not smaller than 5 μm and not larger than 125 μm from the viewpoint of adhesion to the supporting substrate 10 and optical reflection. When the thickness of the non-columnar portion 41 is too small, there is a fear that sufficient adhesion to the supporting substrate 10 cannot be obtained. When the thickness of the non-columnar portion 41 is too large, contribution of fluorescence in the non-columnar portion 41 and diffusion caused by optical reflection in the non-columnar portion 41 increase so that there is a fear that the image sharpness may deteriorate.

The non-columnar portion 41 and the columnar portion 40 are formed on the supporting substrate 10, for example, by a vapor deposition method integrally and continuously in that order. Specifically, under the environment with a vacuum degree of 0.01 to 10 Pa, CsI:Tl is heated and evaporated by means of resistance heating crucibles to which electric power is applied. Thus, CsI:Tl is deposited on the supporting substrate 10 whose temperature is set at a room temperature (20° C.) to 300° C.

At the beginning of formation of a crystal phase of CsI:Tl on the supporting substrate 10, comparatively small-diameter granular crystals 42 are deposited to form the non-columnar portion 41. At least one of the conditions, that is, the degree of vacuum or the temperature of the supporting substrate 10 is then changed. Thus, the columnar portion 40 is formed continuously after the non-columnar portion 41 is formed. Specifically, the degree of vacuum and/or the temperature of the supporting substrate 10 are increased so that a group of columnar crystals 43 are grown.

Figure 12:
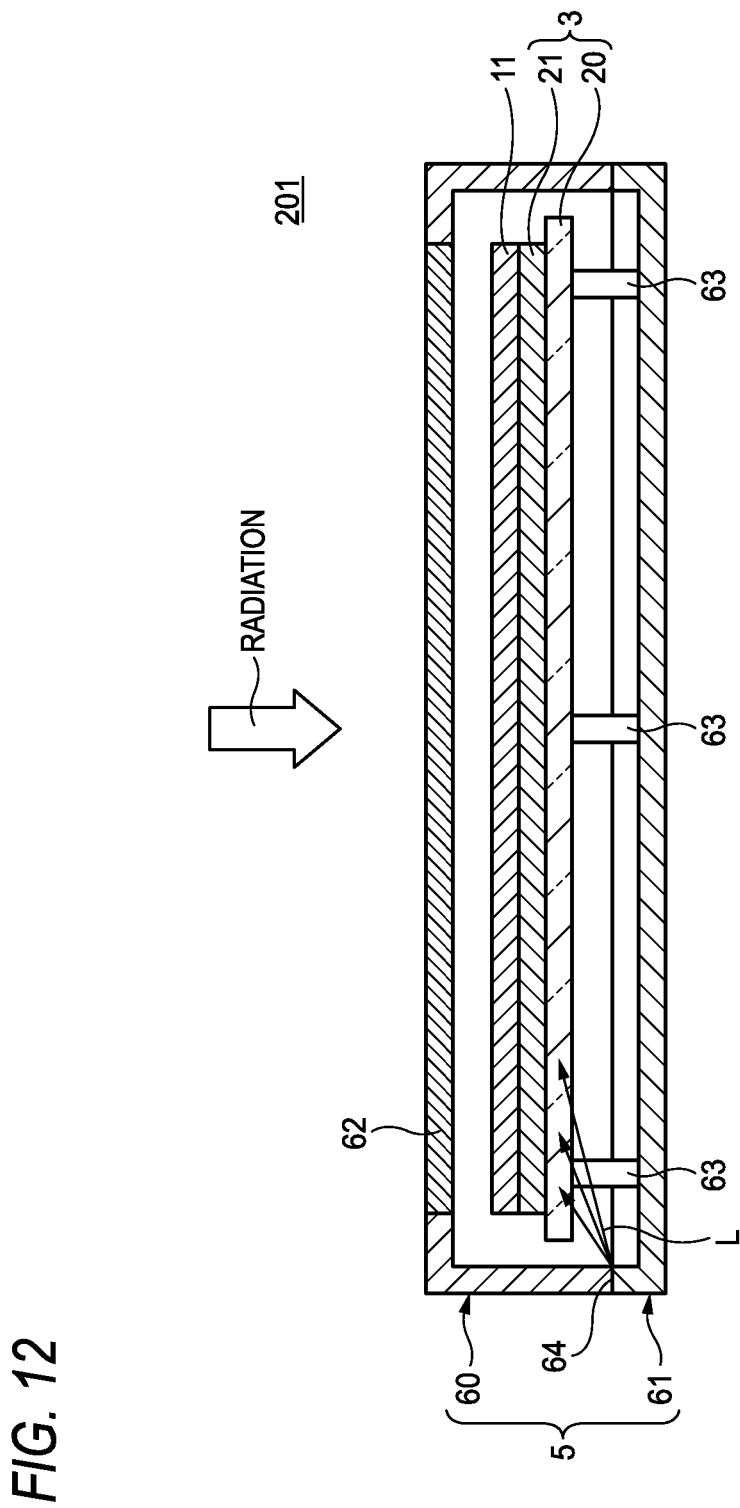
FIG. 12 is a view schematically illustrating the configuration of a radiological image detection apparatus according to yet another exemplary embodiment of the present invention.

FIG. 12 illustrates a configuration of a radiological image detection apparatus according to yet another exemplary embodiment of the present invention. With respect to the elements common to those of the above-described radiological image detection apparatus 1, the descriptions thereof will be omitted or simplified by using the common numeral references.

A radiological image detection apparatus 201 illustrated in FIG. 12 includes a radiological image conversion panel 2, a sensor panel 3 and a case 5 for receiving the radiological image conversion panel 2 and the sensor panel 3.

The scintillator 11 is formed by a group of columnar crystals 43 of phosphor, using the sensor panel 3 as a support, that is, using an insulating substrate 20, on which a pixel array 21 is installed, as the support. That is, in the radiological image detection apparatus 201, the insulating substrate 20 supports both of the pixel array 21 and the scintillator 11.

The radiological image detection apparatus 201 is a penetration side sampling (PSS) radiological image detection apparatus, in which the scintillator 11, the pixel array 21, and the insulating substrate 20 are arranged in this order from the ceiling plate part 62 side of the case 5, to which radiation is incident after penetrating a subject. The radiation is incident to the scintillator 11 after penetrating the ceiling plate part 62. The scintillator 11, to which the radiation is incident, generates fluorescence, which is in turn detected by the pixel array 21.

The edge of a joint portion 64 between a first member 60 and a second member 61 in the inner space of the case 5 is located closer to the bottom side of the case 5 that opposes a ceiling plate part 62, than the insulating substrate 20 of the sensor panel 3.

In the radiological image detection apparatus 201 configured as described above, the scintillator 11 and the pixel array 21 are disposed between the insulating substrate 20 of the sensor panel 3 and the ceiling plate part 62 of the case 5, and the insulating substrate 20 has a characteristic that absorbs light of at least a part of a wavelength region that is sensed by the pixel array 21.

When external light L enters into the inner space of the case 5 from the joint portion 64 of the case 5, a light component included in the absorption wavelength region of the insulating substrate 20 is absorbed by the insulating substrate 20. Accordingly, the external light L entering into the inner space is suppressed from being received by the pixel array 21, and the image noise is reduced.

In particular, the entire edge of the joint portion 64 in the inner space of the case 5 is located at a relatively lower side of the case 5 as compared to the insulating substrate 20. Even if the light is diffused by diffraction at the edge of the joint portion 64, almost all of the light is blocked by the insulating substrate 20 and is suppressed from being reached at the pixel array 21 which is located closer to the ceiling plate part 62 side than the insulating substrate 20. Accordingly, the external light L entering into the inner space is further suppressed from being received by the pixel array 21, thereby reducing the image noise.

Figure 13:
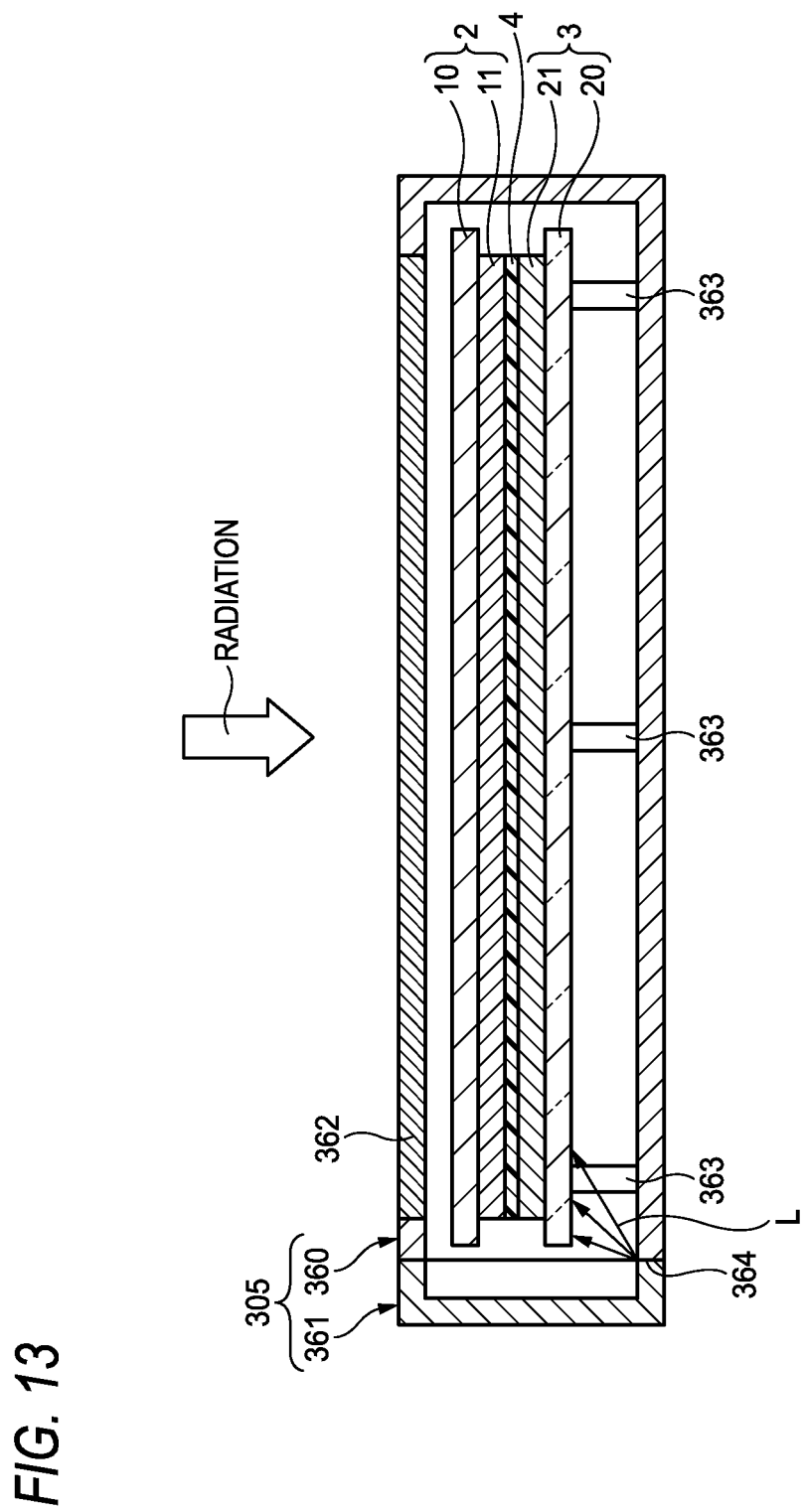
FIG. 13 is a view schematically illustrating the configuration of a radiological image detection apparatus according to yet another exemplary embodiment of the present invention.

FIG. 13 illustrates a configuration of a radiological image detection apparatus according to yet another exemplary embodiment of the present invention. With respect to the elements common to those of the above-described radiological image detection apparatus 1, the description thereof will be omitted or simplified by using the common numeral references.

A radiological image detection apparatus 301 illustrated in FIG. 13 has a radiological image conversion panel 2, a sensor panel 3 and a case 305 that accommodates the radiological image conversion panel 2 and the sensor panel 3.

The case 305 includes a first member 360 having a cylindrical shape of which one lateral side is opened and a second member 361 that covers the opened side of the first member 360. The first member 360 includes a ceiling plate part 362 through which radiation penetrates. The first member 360 and the second member 361 are coupled together to form a lightproof space therein. The radiological image conversion panel 2 and the sensor panel 3 are bonded together and received in the inner space.

The radiological image conversion panel 2 and the sensor panel 3 arranged as described above are supported by a plurality of ribs 363 provided vertically on the first member 360, and fixed in the inner space of the case 305. The edge of a joint portion 364 between the first member 360 and the second member 361 in the inner space of the case 305 exists on the top side, bottom side and a pair of lateral sides connecting the top and bottom sides, and a part of the edge is located closer to the bottom side of the case 305 than the insulating substrate 20 of the sensor panel 3.

When external light L enters into the inner space of the case 305 from the joint portions 364 of the case 305, a light component included in an absorption wavelength region of the insulating substrate 20 is absorbed by the insulating substrate 20. Accordingly, the external light L entering into the inner space is suppressed from being received by the pixel array 21, and the image noise is reduced.

In particular, a part of the edge of the joint portion 364 in the inner space of the case 305 is located closer to the bottom side of the case 305 than the insulating substrate 20. Almost all the external light L entering from the joint portion area located closer to the bottom side is blocked by the insulating substrate 20 and is suppressed from being reached at the pixel array 21 which is located closer to the ceiling plate part 362 side than the insulating substrate 20. Accordingly, the external light L entering into the inner space is further suppressed from being received by the pixel array 21, thereby reducing the image noise.

A lightproof member may be provided to cover a side of the scintillator 11 that appears between the ceiling plate part 362 and the insulating substrate 20. A part of the edge of the joint portion 364 appearing in the inner space of the case 305 is located closer to the ceiling plate part 362 side than the insulating substrate 20, and the light L entering through the joint portion area located closer to the ceiling plate part 362 side is incident to the side of the scintillator 11 to be detected by the pixel array 21. Therefore, it can be ensured that the external light L is suppressed from being incident to the side of the scintillator 11 by providing the lightproof member that covers the side of the scintillator 11. This lightproof member may be applied to any of the above-described radiological image detection apparatuses 1, 101, 201.

Since the aforementioned radiological image detection apparatus can detect a radiological image with high sensitivity and high definition, it can be installed and used in an X-ray imaging apparatus for the purpose of medical diagnosis, such as a mammography apparatus, required to detect a sharp image with a low dose of radiation, and other various apparatuses. For example, the radiological image detection apparatus is applicable to an industrial X-ray imaging apparatus for nondestructive inspection, or an apparatus for detecting particle rays (α-rays, β-rays, γ-rays) other than electromagnetic waves. The radiological image detection apparatus has a wide range of applications.

Description will be made below on materials which can be used for constituent members of the sensor panel 3.

[Photoelectric Conversion Element]

As the photoconductive layer 25 (see FIG. 2) of the aforementioned photoelectric conversion elements 23, for example, a film formed out of any OPC (Organic Photoelectric Conversion) material (hereinafter referred to as OPC film) disclosed in JP-A-2009-032854 may be used. The OPC film contains an organic photoelectric conversion material, absorbing light emitted from a phosphor and generating electric charges in accordance with the absorbed light. Such an OPC film containing an organic photoelectric conversion material has a sharp absorption spectrum in a visible light range. Thus, electromagnetic waves other than light emitted from the phosphor are hardly absorbed by the OPC film, but noise generated by radiation such as X-rays absorbed by the OPC film can be suppressed effectively.

It is preferable that the absorption peak wavelength of the organic photoelectric conversion material forming the OPC film is closer to the peak wavelength of light emitted by the phosphor in order to more efficiently absorb the light emitted by the phosphor. Ideally, the absorption peak wavelength of the organic photoelectric conversion material agrees with the peak wavelength of the light emitted by the phosphor. However, if the difference between the absorption peak wavelength of the organic photoelectric conversion material and the peak wavelength of the light emitted by the phosphor is small, the light emitted by the phosphor can be absorbed satisfactorily. Specifically, the difference between the absorption peak wavelength of the organic photoelectric conversion material and the peak wavelength of the light emitted by the phosphor in response to radioactive rays is preferably not larger than 10 nm, more preferably not larger than 5 nm.

Examples of the organic photoelectric conversion material that can satisfy such conditions include arylidene-based organic compounds, quinacridone-based organic compounds, and phthalocyanine-based organic compounds. For example, the absorption peak wavelength of quinacridone in a visible light range is 560 nm. Therefore, when quinacridone is used as the organic photoelectric conversion material and CsI (Tl) is used as the phosphor material, the aforementioned difference in peak wavelength can be set within 5 nm so that the amount of electric charges generated in the OPC film can be increased substantially to the maximum.

At least a part of an organic layer provided between the bias electrode 26 and the charge collection electrode 27 can be formed out of an OPC film. More specifically, the organic layer can be formed out of a stack or a mixture of a portion for absorbing electromagnetic waves, a photoelectric conversion portion, an electron transport portion, an electron hole transport portion, an electron blocking portion, an electron hole blocking portion, a crystallization prevention portion, electrodes, interlayer contact improvement portions, etc.

Preferably the organic layer contains an organic p-type compound or an organic n-type compound. An organic p-type semiconductor (compound) is a donor-type organic semiconductor (compound) as chiefly represented by an electron hole transport organic compound, meaning an organic compound having characteristic to easily donate electrons. More in detail, of two organic materials used in contact with each other, one with lower ionization potential is called the donor-type organic compound. Therefore, any organic compound may be used as the donor-type organic compound as long as the organic compound having characteristic to donate electrons. Examples of the donor-type organic compound that can be used include a triarylamine compound, a benzidine compound, a pyrazoline compound, a styrylamine compound, a hydrazone compound, a triphenylmethane compound, a carbazole compound, a polysilane compound, a thiophene compound, a phthalocyanine compound, a cyanine compound, a merocyanine compound, an oxonol compound, a polyamine compound, an indole compound, a pyrrole compound, a pyrazole compound, a polyarylene compound, a fused aromatic carbocyclic compound (naphthalene derivative, anthracene derivative, phenanthrene derivative, tetracene derivative, pyrene derivative, perylene derivative, fluoranthene derivative), a metal complex having a nitrogen-containing heterocyclic compound as a ligand, etc. The donor-type organic semiconductor is not limited thereto but any organic compound having lower ionization potential than the organic compound used as an n-type (acceptor-type) compound may be used as the donor-type organic semiconductor.

The n-type organic semiconductor (compound) is an acceptor-type organic semiconductor (compound) as chiefly represented by an electron transport organic compound, meaning an organic compound having characteristic to easily accept electrons. More specifically, when two organic compounds are used in contact with each other, one of the two organic compounds with higher electron affinity is the acceptor-type organic compound. Therefore, any organic compound may be used as the acceptor-type organic compound as long as the organic compound having characteristic to accept electrons. Examples thereof include a fused aromatic carbocyclic compound (naphthalene derivative, anthracene derivative, phenanthrene derivative, tetracene derivative, pyrene derivative, perylene derivative, fluoranthene derivative), a 5- to 7-membered heterocyclic compound containing a nitrogen atom, an oxygen atom or a sulfur atom (e.g. pyridine, pyrazine, pyrimidine, pyridazine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazole, benzothiazole, carbazole, purine, triazolopyridazine, triazolopyrimidine, tetrazaindene, oxadiazole, imidazopyridine, pyralidine, pyrrolopyridine, thiadiazolopyridine, dibenzazepine, tribenzazepine etc.), a polyarylene compound, a fluorene compound, a cyclopentadiene compound, a silyl compound, and a metal complex having a nitrogen-containing heterocyclic compound as a ligand. The acceptor-type organic semiconductor is not limited thereto. Any organic compound may be used as the acceptor-type organic semiconductor as long as the organic compound has higher electron affinity than the organic compound used as the donor-type organic compound.

As for p-type organic dye or n-type organic dye, any known dye may be used. Preferred examples thereof include cyanine dyes, styryl dyes, hemicyanine dyes, merocyanine dyes (including zero-methine merocyanine (simple merocyanine)), trinuclear merocyanine dyes, tetranuclear merocyanine dyes, rhodacyanine dyes, complex cyanine dyes, complex merocyanine dyes, alopolar dyes, oxonol dyes, hemioxonol dyes, squarylium dyes, croconium dyes, azamethine dyes, coumarin dyes, arylidene dyes, anthraquinone dyes, triphenylmethane dyes, azo dyes, azomethine dyes, spiro compounds, metallocene dyes, fluorenone dyes, flugide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, quinophthalone dyes, phenoxazine dyes, phthaloperylene dyes, porphyrin dyes, chlorophyll dyes, phthalocyanine dyes, metal complex dyes, and fused aromatic carbocyclic dyes (naphthalene derivative, anthracene derivative, phenanthrene derivative, tetracene derivative, pyrene derivative, perylene derivative, fluoranthene derivative).

A photoelectric conversion film (photosensitive layer) which has a layer of a p-type semiconductor and a layer of an n-type semiconductor between a pair of electrodes and at least one of the p-type semiconductor and the n-type semiconductor is an organic semiconductor and in which a bulk heterojunction structure layer including the p-type semiconductor and the n-type semiconductor is provided as an intermediate layer between those semiconductor layers may be used preferably. The bulk heterojunction structure layer included in the photoelectric conversion film can cover the defect that the carrier diffusion length of the organic layer is short. Thus, the photoelectric conversion efficiency can be improved. The bulk heterojunction structure has been described in detail in JP-A-2005-303266.

It is preferable that the photoelectric conversion film is thicker in view of absorption of light from the phosphor layer. The photoelectric conversion film is preferably not thinner than 30 nm and not thicker than 300 nm, more preferably not thinner than 50 inn and not thicker than 250 nm, particularly more preferably not thinner than 80 nm and not thicker than 200 nm in consideration of the ratio which does make any contribution to separation of electric charges.

As for any other configuration about the aforementioned OPC film, for example, refer to description in JP-A-2009-032854.

[Switching Device]

As the switching device 24, any organic material as disclosed in JP-A-2009-212389, for example, may be used. Although the organic TFT may have any type of structure, a field effect transistor (FET) structure is the most preferable. In the FET structure, a gate electrode is provided on a part of an upper surface of an insulating substrate, and an insulator layer is provided to cover the electrode and touch the substrate in the other portion than the electrode. Further, a semiconductor active layer is provided on an upper surface of the insulator layer, and a transparent source electrode and a transparent drain electrode are disposed on a part of an upper surface of the semiconductor active layer and at a distance from each other. This configuration is called a top contact type device. However, a bottom contact type device in which a source electrode and a drain electrode are disposed under a semiconductor active layer may be also used preferably. In addition, a vertical transistor structure in which a carrier flows in the thickness direction of an organic semiconductor film may be used.

(Active Layer)

Organic semiconductor materials mentioned herein are organic materials showing properties as semiconductors. Examples of the organic semiconductor materials include p-type organic semiconductor materials (or referred to as p-type materials simply or as electron hole transport materials) which conduct electron holes (holes) as carriers, and n-type organic semiconductor materials (or referred to as n-type materials simply or as electrode transport materials) which conduct electrons as carriers, similarly to a semiconductor formed out of an inorganic material. Of the organic semiconductor materials, lots of p-type materials generally show good properties. In addition, p-type transistors are generally excellent in operating stability as transistors under the atmosphere. Here, description here will be made on a p-type organic semiconductor material.

One of properties of organic thin film transistors is a carrier mobility (also referred to as mobility simply) μ which indicates the mobility of a carrier in an organic semiconductor layer. Although preferred mobility varies in accordance with applications, higher mobility is generally preferred. The mobility is preferably not lower than $1.0*10^{-7}$ cm$^2$/Vs, more preferably not lower than $1.0*10^{-6}$ cm$^2$/Vs, further preferably not lower than $1.0*10^{-5}$ cm$^2$/Vs. The mobility can be obtained by properties or TOF (Time Of Flight) measurement when the field effect transistor (FET) device is manufactured.

The p-type organic semiconductor material may be either a low molecular weight material or a high molecular weight material, but preferably a low molecular weight material. Lots of low molecular weight materials typically show excellent properties due to easiness in high purification because various refining processes such as sublimation refining, recrystallization, column chromatography, etc. can be applied thereto, or due to easiness in formation of a highly ordered crystal structure because the low molecular weight materials have a fixed molecular structure. The molecular weight of the low molecular weight material is preferably not lower than 100 and not higher than 5,000, more preferably not lower than 150 and not higher than 3,000, further more preferably not lower than 200 and not higher than 2,000.

A phthalocyanine compound or a naphthalocyanine compound may be exemplified as such a p-type organic semiconductor material. A specific example thereof is shown as follows. M represents a metal atom, Bu represents a butyl group, Pr represents a propyl group, Et represents an ethyl group, and Ph represents a phenyl group.

[Chemical Formula 1]

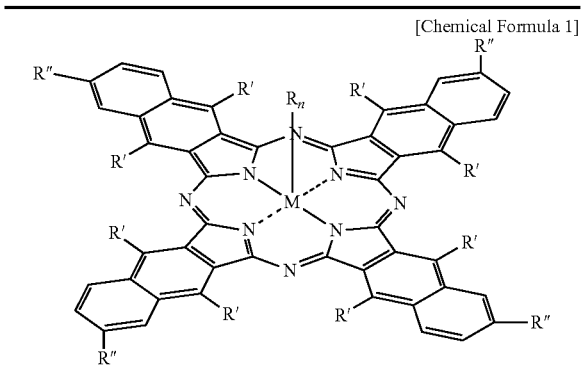

compound 1~15

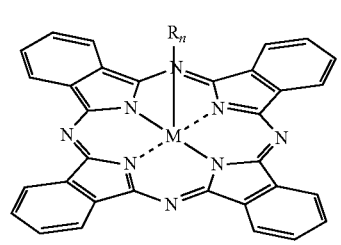

compound 16~20

| compound | M | R | n | R' | R" |
|---|---|---|---|---|---|
| 1 | Si | OSi(n-Bu)$_3$ | 2 | H | H |
| 2 | Si | OSi(i-Pr)$_3$ | 2 | H | H |
| 3 | Si | OSi(OEt)$_3$ | 2 | H | H |
| 4 | Si | OSiPh$_3$ | 2 | H | H |
| 5 | Si | O(n-C$_8$H$_{17}$) | 2 | H | H |
| 7 | Ge | OSi(n-Bu)$_3$ | 2 | H | H |
| 8 | Sn | OSi(n-Bu)$_3$ | 2 | H | H |
| 9 | Al | OSi(n-C$_6$H$_{13}$)$_3$ | 1 | H | H |
| 10 | Ga | OSi(n-C$_6$H$_{13}$)$_3$ | 1 | H | H |
| 11 | Cu | — | — | O(n-Bu) | H |
| 12 | Ni | — | — | O(n-Bu) | H |
| 13 | Zn | — | — | H | t-Bu |
| 14 | V=O | — | — | H | t-Bu |
| 15 | H$_2$ | — | — | H | t-Bu |
| 16 | Si | OSiEt$_3$ | 2 | — | — |
| 17 | Ge | OSiEt$_3$ | 2 | — | — |
| 18 | Sn | OSiEt$_3$ | 2 | — | — |
| 19 | Al | OSiEt$_3$ | 1 | — | — |
| 20 | Ga | OSiEt$_3$ | 1 | — | — |

(Constituent Members of Switching Device Other than Active Layer)

The material forming the gate electrode, the source electrode or the drain electrode is not limited particularly if it has required electric conductivity. Examples thereof include: transparent electrically conductive oxides such as ITO (indium-doped tin oxide), IZO (indium-doped zinc oxide), SnO$_2$, ATO (antimony-doped tin oxide), ZnO, AZO (aluminum-doped zinc oxide), GZO (gallium-doped zinc oxide), TiO$_2$, FTO (fluorine-doped tin oxide), etc.; transparent electrically conductive polymers such as PEDOT/PSS (poly(3,4-ethylenedioxythiophene)/polystyrenesulfonate); carbon materials such as carbon nanotube; etc. These electrode materials may be formed into films, for example, by a vacuum deposition method, sputtering, a solution application method, etc.

The material used for the insulating layer is not limited particularly as long as it has required insulating effect. Examples thereof include: inorganic materials such as silicon dioxide, silicon nitride, alumina, etc.; and organic materials such as polyester (PEN (polyethylene naphthalate), PET (polyethylene terephthalate) etc.), polycarbonate, polyimide, polyamide, polyacrylate, epoxy resin, polyparaxylylene resin, novolak resin, PVA (polyvinyl alcohol), PS (polystyrene), etc. These insulating film materials may be formed into films, for example, by a vacuum deposition method, sputtering, a solution application method, etc.

As for any other configuration about the aforementioned organic TFT, for example, refer to the description in JP-A-2009-212389.

In addition, for example, amorphous oxide disclosed in JP-A-2010-186860 may be used for the active layer of the switching devices 24. Here, description will be made on an amorphous oxide containing active layer belonging to an FET transistor disclosed in JP-A-2010-186860. The active layer serves as a channel layer of the FET transistor where electrons or holes can move.

The active layer is configured to contain an amorphous oxide semiconductor. The amorphous oxide semiconductor can be formed into a film at a low temperature. Thus, the amorphous oxide semiconductor can be formed preferably on a flexible substrate. The amorphous oxide semiconductor used for the active layer is preferably of amorphous oxide containing at least one kind of element selected from a group consisting of In, Sn, Zn and Cd, more preferably of amorphous oxide containing at least one kind of element selected from a group consisting of In, Sn and Zn, further preferably of amorphous oxide containing at least one kind of element selected from a group consisting of In and Zn.

Specific examples of the amorphous oxide used for the active layer include In$_2$O$_3$, ZnO, SnO$_2$, CdO, Indium-Zinc-Oxide (IZO), Indium-Tin-Oxide (ITO), Gallium-Zinc-Oxide (GZO), Indium-Gallium-Oxide (IGO), and Indium-Gallium-Zinc-Oxide (IGZO).

It is preferable that a vapor phase film formation method targeting at a polycrystal sinter of the oxide semiconductor is used as a method for forming the active layer. Of vapor phase film formation methods, a sputtering method or a pulse laser deposition (PLD) method is suitable. Further, the sputtering method is preferred in view from mass productivity. For example, the active layer is formed by an RF magnetron sputtering deposition method with a controlled degree of vacuum and a controlled flow rate of oxygen.

By a known X-ray diffraction method, it can be confirmed that the active layer formed into a film is an amorphous film. The composition ratio of the active layer is obtained by an RBS (Rutherford Backscattering Spectrometry) method.

In addition, the electric conductivity of the active layer is preferably lower than $10^2$ Scm$^{-1}$ and not lower than $10^{-4}$ Scm$^{-1}$, more preferably lower than $10^2$ Scm$^{-1}$ and not lower than $10^{-1}$ Scm$^{-1}$. Examples of the method for adjusting the electric conductivity of the active layer include an adjusting method using oxygen deficiency, an adjusting method using a composition ratio, an adjusting method using impurities, and an adjusting method using an oxide semiconductor material, as known.

As for any other configuration about the aforementioned amorphous oxide, for example, refer to description in JP-A-2010-186860.

(Insulating Substrate)

For example, a plastic film having an excellent light transmissivity may be used as the insulating substrate 20. As for the plastic film, a film made of for example, polyethylene terephthalate (PET), polyethylene naphthalate (PEN), polyether sulfone (PES), polyether imide, polyether-ether-ketone, polyphenylene sulphide, polycarbonate (PC), cellulose triacetate (TAC), cellulose acetate propionate (CAP), polyimide, polyarylate, and bi-axially stretched polystyrene (OPS), may be used. Further, organic or inorganic fillers may be contained in such plastic film. Further, a flexible substrate formed using, for example, an aramid or a bio nano-fiber which has a characteristic that cannot be obtained by an existing glass or plastic, such as, for example, low-thermal expansion and high-strength while being flexible. Among them, for example, polyarylate (glass transition temperature: about 193° C.), bi-axially stretched polystyrene (decomposition temperature: 250° C.), polyimide (glass transition temperature: about 300° C.), and aramid (glass transition temperature: about 315° C.), which have thermal resistance, may be appropriately used. As a result, the scintillator may be formed directly on the insulating substrate.

(Aramid)

An aramid material has a high thermal resistance with the glass transition temperature of 315° C., a high stiffness with the Young's Modulus of 10 GPa, and a high dimensional stability with a thermal expansion rate of −3 ppm/° C. to 5 ppm/° C. For this reason, a high quality semiconductor film may be readily formed using an aramid film as compared to using a general resin film. In addition, due to the high thermal resistance of the aramid material, it is possible to cure an electrode material at a high temperature and reduce the electrical resistance of the electrode material. It is also possible to cope with an automatic integrated circuit (IC) mounting process including a reflow process of solder. Moreover, since the thermal expansion coefficient of aramid material is similar to that of indium tin oxide (ITO), gas, barrier film and glass film, the warping is less severe after manufacturing and the product is hardly cracked. Herein, a halogen-free aramid material that does not include a halogen and is suitable for the JPCA-ES01-2003 standard) may be used from the viewpoint of reducing environment load. The aramid film may be stacked on a glass substrate or PET substrate, or may be bond to the case of a device.

The low solubility to a solvent due to the high cohesiveness (hydrogen bonding force) between the molecules of aramid may be improved by a molecular design, and as a result, a colorless and transparent thin film of aramid material can be readily formed and used appropriately. With a molecular design which controls the orderliness of monomer units, the location and type of a substituent on an aromatic ring, it is possible to readily form a film with good solubility while maintaining a rod-shaped molecular structure having high linearity, which in turn relates to the dimensional stability or high stiffness of the aramid material. Halogen-free may be realized by the molecular design.

An aramid material with an optimized characteristic of an in-plane direction in a film may be appropriately used. By controlling the tension condition at each of the processes of solution casting, vertical stretching, and horizontal stretching based on the strength of the aramid film which is sequentially changed during the forming, it is possible to balance the characteristic of the in-plane direction of the aramid film, which has a rod-shaped molecular structure with high linearity and is prone to turn into anisotropy in a physical property.

Specifically, in the solution casting process, an optimization may be attempted for an isotropy of the physical property of in-plane thickness direction, the strength of the film in a state of containing the solvent and the peeling strength from a cast and a drum. In a vertical stretching process, the stretching condition may be controlled precisely based on the strength of the film and the remaining amount of the solvent which changes sequentially during the stretching process. In a horizontal stretching process, the conditions of the horizontal stretching based on the change in the film strength that changes by heating and conditions for alleviating the remaining stress of the film are controlled. When such an aramid material is used, it is possible to solve the problem that the aramid film is curled after formed 1.

In any of the designs for facilitating the forming of a film and for balancing the characteristic of in-plane direction of the film, the thermal expansion coefficients is maintained to be low, because the highly linear rod-shaped molecular structure, which is a distinct characteristic of aramid material, is maintained. It is also possible to further reduce the thermal expansion coefficients by changing the stretching condition when forming the film.

(Bio Nano-Fiber)

When the components of nano-fibers are sufficiently small as compared to the wavelength of light, a light scattering does not occur, and the nano-fibers can be employed as a reinforcement of a transparent and flexible resin material. Among the nano-fibers, cellulose micro-fibril bundles produced by bacteria (*Acetobacter Xylinum*) has a width of 50 nm and a size about a 1/10 of the wavelength of the visible light, and has characteristics of high solidity, high elasticity, and low thermal expansion. A composite material of the bacteria-cellulose and a transparent resin (also, referred to as "bio nano-fiber") may be appropriately used.

It is possible to obtain a transparent bio nano-fiber which contains fibers at a high rate of about 60% to 70% and shows a light transmissivity of about 90% at 500 nm wavelength by impregnating a transparent resin, such as, for example, acryl resin and epoxy resin, into a bacteria-cellulose sheet and curing the resin. With this bio nano-fiber, it is possible to obtain a low thermal expansion coefficient comparable with that of a silicon crystal (about 3 ppm to about 7 ppm), a high strength as in a steel (about 460 MPa), and a high elasticity (about 30 GPa). Reference for the configuration related to the above-described bio nano-fibers, may be made to, for example, the disclosure in the JP-A-2008-034556.

As described above, the present specification discloses radiological image detection apparatuses of from (1) to (12) below.

(1) A radiological image detection apparatus includes a scintillator, a pixel array, a first support and a case. The scintillator is formed of phosphor which emits fluorescence when exposed to radiation. The pixel array is provided in close contact with the scintillator and is configured to detect the fluorescence emitted from the scintillator. The first support is configured to support at least one of the scintillator and the pixel array. The case includes a plurality of members having a first member provided with a ceiling plate part through which light penetrates. The case is configured to house the scintillator, the pixel array and the support in a lightproof inner space formed by combining the plurality of members. The scintillator and the pixel array are disposed between the first support and the ceiling plate part. The first support absorbs light of a wavelength region corresponding to at least a part of a wavelength region which is sensed by the pixel array.

(2) The radiological image detection apparatus of (1), the wavelength region absorbed by the first support includes the maximum sensitivity wavelength of the pixel array.

(3) The radiological image detection apparatus of (1) or (2), at least some of joint portions of the plurality of members are located closer to a bottom side of the case than the first support, the bottom side opposing the ceiling plate part.

(4) The radiological image detection apparatus of (1), the plurality of members include first and second members. The first and second members are combined with each other through joint portions so as to form the lightproof space therein. The joint portions are between the first and second members. The first support absorbs light which enters into the lightproof space from the joint portion.

(5) The radiological image detection apparatus of (1), the plurality of members include first and second members. The first and second members are combined with each other through joint portions so as to form the lightproof space therein. The joint portions are between the first and second members. At least one of the joint portions is located closer to a bottom side of the case than the first support. The bottom side is opposite to the ceiling plate part which is in a top side of the case.

(6) The radiological image detection apparatus of (1), the phosphor includes thallium activated cesium iodide.

(7) The radiological image detection apparatus of (2), the maximum sensitivity wavelength includes 550 nm to 560 nm.

(8) The radiological image detection apparatus of (3), the scintillator is provided on the first support. The pixel array is provided on a second support and is bonded to a surface of the scintillator opposite to the side that contacts with the first support. The second support, the pixel array, the scintillator, and the first support are disposed in this order from a side of the ceiling plate part.

(9) The radiological image detection apparatus of (8), the scintillator has a columnar portion formed by a group of columnar crystals which are obtained by growing crystals of the phosphor in a columnar shape, the columnar portion being bonded to the pixel array on a surface configured by a group of tip ends of the columnar crystals. The first support is flexible.

(10) The radiological image detection apparatus of (9), the first support is made of a colored resin material.

(11) The radiological image detection apparatus of (10), the resin material is colored with black.

(12) The radiological image detection apparatus of any one of (9) to (11), a reflective layer is provided at a joint portion of the scintillator and the first support.

(13) The radiological image detection apparatus of (12), the scintillator has a non-columnar portion formed by a group of granular crystals of the phosphor between the first support and the columnar portion.

(14) The radiological image detection apparatus of (13), the non-columnar portion is the reflective layer.

(15) The radiological image detection apparatus of any one of (8) to (14), the second support is disposed in close contact with the ceiling plate part.

(16) The radiological image detection apparatus of any one of (1) to (15) further includes a lightproof member which covers a side of the scintillator.

What is claimed is:

1. A radiological image detection apparatus comprising:
   a scintillator that is formed of phosphor which emits fluorescence when exposed to radiation;
   a pixel array that is provided in close contact with the scintillator and that is configured to detect the fluorescence emitted from the scintillator;
   a first support that is configured to support at least one of the scintillator and the pixel array; and
   a case that includes a plurality of members having a first member provided with a ceiling plate part through which light penetrates, and that is configured to house the scintillator, the pixel array and the support in a lightproof inner space formed by combining the plurality of members,
   wherein the scintillator and the pixel array are disposed between the first support and the ceiling plate part,
   wherein the first support absorbs light of a wavelength region corresponding to at least a part of a wavelength region which is sensed by the pixel array,
   wherein at least some of joint portions of the plurality of members are located closer to a bottom side of the case than the first support, the bottom side opposing the ceiling plate part,
   wherein the scintillator is provided on the first support,
   wherein the pixel array is provided on a second support and is bonded to a surface of the scintillator opposite to the side that contacts with the first support, and
   wherein the second support, the pixel array, the scintillator, and the first support are disposed in this order from a side of the ceiling plate part.

2. The radiological image detection apparatus of claim 1, wherein the wavelength region absorbed by the first support includes the maximum sensitivity wavelength of the pixel array.

3. The radiological image detection apparatus of claim 1, wherein the plurality of members include first and second members,
   the first and second members are combined with each other through the joint portions so as to form the lightproof space therein, the joint portions being between the first and second members, and
   the first support absorbs light which enters into the lightproof space from the joint portion.

4. The radiological image detection apparatus of claim 1, wherein the plurality of members include first and second members,
   the first and second members are combined with each other through the joint portions so as to form the lightproof space therein, the joint portions being between the first and second members, and
   one of the joint portions is located closer to a bottom side of the case than the first support, the bottom side being opposite to the ceiling plate part which is in a top side of the case.

5. The radiological image detection apparatus of claim 1, wherein the phosphor includes thallium activated cesium iodide.

6. The radiological image detection apparatus of claim 2, wherein the maximum sensitivity wavelength includes 550 nm to 560 nm.

7. The radiological image detection apparatus of claim 1, wherein the scintillator has a columnar portion formed by a group of columnar crystals which are obtained by growing crystals of the phosphor in a columnar shape, the columnar portion being bonded to the pixel array on a surface configured by a group of tip ends of the columnar crystals, and the first support is flexible.

8. The radiological image detection apparatus of claim 7, wherein the first support is made of a colored resin material.

9. The radiological image detection apparatus of claim 8, wherein the resin material is colored with black.

10. The radiological image detection apparatus of claim 7, wherein a reflective layer is provided at a joint portion of the scintillator and the first support.

11. The radiological image detection apparatus of claim 10, wherein the scintillator has a non-columnar portion formed by a group of granular crystals of the phosphor between the first support and the columnar portion.

12. The radiological image detection apparatus of claim 11, wherein the non-columnar portion is the reflective layer.

13. The radiological image detection apparatus of claim 1, wherein the second support is disposed in close contact with the ceiling plate part.

14. The radiological image detection apparatus of claim 1, further comprising:

a lightproof member that covers a side of the scintillator.

* * * * *